US010833337B2

(12) United States Patent
Stahl et al.

(10) Patent No.: US 10,833,337 B2
(45) Date of Patent: Nov. 10, 2020

(54) ELECTROCHEMICAL DEVICE AND METHOD FOR PRODUCING AN ELECTROCHEMICAL UNIT FOR AN ELECTROCHEMICAL DEVICE

(71) Applicant: ElringKlinger AG, Dettingen (DE)

(72) Inventors: Peter Stahl, Metzingen (DE); Juergen Kraft, Metzingen (DE); Michael Goetz, Dettingen (DE)

(73) Assignee: ElringKlinger AG, Dettingen (DE)

(*) Notice: Subject to any disclaimer, the term of this patent is extended or adjusted under 35 U.S.C. 154(b) by 149 days.

(21) Appl. No.: 15/837,146

(22) Filed: Dec. 11, 2017

(65) Prior Publication Data

US 2018/0102554 A1    Apr. 12, 2018

Related U.S. Application Data

(63) Continuation of application No. PCT/EP2016/062675, filed on Jun. 3, 2016.

(30) Foreign Application Priority Data

Jun. 12, 2015    (DE) .................. 10 2015 109 393

(51) Int. Cl.
  *C25B 9/18*    (2006.01)
  *H01M 8/0273*    (2016.01)
  (Continued)

(52) U.S. Cl.
  CPC ........... *H01M 8/0273* (2013.01); *C25B 9/08* (2013.01); *C25B 9/20* (2013.01); *C25B 9/206* (2013.01);
  (Continued)

(58) Field of Classification Search
  CPC ........... C25B 9/18; C25B 15/08; C25B 9/203; C25B 9/045
  (Continued)

(56) References Cited

U.S. PATENT DOCUMENTS 5,756,874 A * 5/1998 Steward ............... C25B 9/08
                                                      204/255
7,081,314 B2    7/2006 Inoue et al.
(Continued)

FOREIGN PATENT DOCUMENTS

| EP | 1 403 949 | 5/2008 |
|----|-----------|--------|
| EP | 2 033 250 | 1/2011 |
| EP | 1 296 394 | 8/2011 |
| JP | 2009-151995 | 7/2009 |

OTHER PUBLICATIONS

Stahl, P., et al., "Water Distribution Analysis in the Outer Perimeter Region of Technical PEFC Based on Neutron Radiography," *Journal of The Electrochemical Society*, 2015, vol. 162(7), pp. F677-F685.

*Primary Examiner* — Zulmariam Mendez
(74) *Attorney, Agent, or Firm* — Womble Bond Dickinson (US) LLP

(57) ABSTRACT

An electrochemical device is provided that includes a stack of a plurality of electrochemical units that succeed one another in a stacking direction and each include an electrochemically active membrane electrode assembly, at least one gas diffusion layer and a bipolar plate having at least one flow field, in which at least one flow field is sealed off simply and reliably and the occurrence of parasitic flows is prevented, wherein at least one bipolar plate has at least one edge web, which borders a flow field of the bipolar plate and is in contact with a gas diffusion layer adjacent to the bipolar plate, and wherein the electrochemical device further includes at least one flow field seal element that seals off the flow field bordered by the edge web and is in contact with the edge web and in contact with the gas diffusion layer.

19 Claims, 24 Drawing Sheets

(51) Int. Cl.
*H01M 8/242* (2016.01)
*H01M 8/2483* (2016.01)
*C25B 9/20* (2006.01)
*C25B 9/08* (2006.01)
*H01M 8/0258* (2016.01)
*H01M 8/1004* (2016.01)
*H01M 8/1018* (2016.01)

(52) U.S. Cl.
CPC ....... *H01M 8/0258* (2013.01); *H01M 8/1004* (2013.01); *H01M 8/1018* (2013.01); *H01M 8/242* (2013.01); *H01M 8/2483* (2016.02); *H01M 2008/1095* (2013.01)

(58) Field of Classification Search
USPC .......................................................... 204/258
See application file for complete search history.

(56) References Cited

U.S. PATENT DOCUMENTS

| | | | |
|---|---|---|---|
| 8,053,290 B2 * | 11/2011 | Tokunaga | H01L 29/66757 438/149 |
| 8,105,725 B2 | 1/2012 | Geiss | |
| 2001/0019791 A1 | 9/2001 | Gooch et al. | |
| 2001/0044042 A1 | 11/2001 | Inoue et al. | |
| 2009/0004542 A1 | 1/2009 | Budinski | |
| 2009/0053573 A1 | 2/2009 | Shibata et al. | |
| 2009/0311571 A1 | 12/2009 | Takahashi et al. | |
| 2010/0000679 A1 | 1/2010 | Han et al. | |
| 2010/0316934 A1 | 12/2010 | Yoshikawa et al. | |
| 2011/0207024 A1 * | 8/2011 | Bogumil | H01M 8/0247 429/514 |
| 2017/0317361 A1 * | 11/2017 | Zillich | H01M 8/0276 |

* cited by examiner

ELECTROCHEMICAL DEVICE AND METHOD FOR PRODUCING AN ELECTROCHEMICAL UNIT FOR AN ELECTROCHEMICAL DEVICE

CROSS-REFERENCE TO RELATED APPLICATIONS

This application is a continuation of International Application No. PCT/EP2016/062675 filed Jun. 3, 2016, which claims priority to German Patent Application No. 10 2015 109 393.6, filed Jun. 12, 2015, both of which are incorporated herein by reference.

FIELD OF DISCLOSURE

The present invention relates to an electrochemical device that includes the following: a stack of a plurality of electrochemical units that succeed one another in a stacking direction and each include an electrochemically active membrane electrode assembly, at least one gas diffusion layer and a bipolar plate having at least one flow field for at least one fluid medium.

An electrochemical device of this kind may in particular take the form of a fuel cell stack or an electrolyzer.

BACKGROUND

In fuel cell stacks and electrolyzers, different media are guided in different levels of an electrochemical unit and, depending on the construction, also in different regions of the same level. These media may in particular be an anodic fluid (fuel gas), a cathodic fluid (oxidant) and where appropriate also a fluid coolant.

These media that are guided through the electrochemical device must not mix with one another or escape from the electrochemical units, so seals are required in a plurality of levels.

These seals may be based for example on elastomer materials and adhesive bonds.

In electrochemical units having metal bipolar plates, the seals may be partly or entirely formed by beads in the bipolar plate or by seals based on elastomer materials.

The bipolar plates (also called separators or interconnects) may be made in one piece or include at least two individual layers (bipolar plate layers).

The bipolar plate layers of a multilayer bipolar plate may be connected to one another by joining methods such as welding or adhesion.

A seal may be inserted into the stack of electrochemical units as a separate component, or fixed to a bipolar plate or another constituent part of an electrochemical unit, for example a gas diffusion layer or a membrane electrode assembly.

Because of advantages for handling and production, and because of the simple seal construction, fixing the seal to a bipolar plate is frequently preferred. This may be done for example by molding a seal, in particular made from an elastomer material, onto a layer of the bipolar plate.

In this seal configuration, the combination of the seal fixed to the bipolar plate and an edge reinforcing arrangement that is fixed to the membrane electrode assembly (in particular a catalyst-coated membrane, CCM) in the edge region of the membrane electrode assembly has proved advantageous, with the edge reinforcing arrangement serving as a counter-component for the seal, helping to prevent a disadvantageous mechanical load on the membrane electrode assembly, and at the same time ensuring an advantageous attachment of the electrochemically active region of the membrane electrode assembly to the edge region of the membrane electrode assembly.

An edge reinforcing arrangement of this kind is disclosed for example in EP 1 403 949 B1.

An edge reinforcing arrangement of this kind is also designated a sub-gasket.

An edge reinforcing arrangement of this kind may include one or more layers, wherein a conventional construction includes two layers that are arranged on two mutually opposite sides of the membrane electrode assembly in the form of a peripheral frame.

When the electrochemical device is produced, the bipolar plate, the gas diffusion layers, the membrane electrode assembly, the seals and where appropriate an edge reinforcing arrangement (sub-gasket) of each electrochemical unit have to be positioned relative to one another, wherein these components may be assembled individually or as sub-assemblies that are already at least partly connected to one another.

When a seal is attached to a gas diffusion layer, this requires not only the gas diffusion layer for application of the seal to be positioned but also the unit comprising the gas diffusion layer and the seal produced thereon to be positioned on the bipolar plate when the stack of electrochemical units is produced.

When the seal is formed on the bipolar plate, the membrane electrode assembly and the gas diffusion layers are positioned on the bipolar plate either as individual components or as preassembled units.

The media to be supplied to the electrochemical device (cathodic fluid, anodic fluid, coolant) are supplied to or removed from the different levels of the electrochemical device by means of a media distribution structure (also designated a manifold) having medium supply channels and medium removal channels extending in the stacking direction of the electrochemical device, and must respectively be supplied from a medium supply channel to the flow field of the medium concerned in an electrochemical unit and be removed from the flow field again by being drawn into a medium removal channel. Here, both the medium supply channels and medium removal channels and also the flow fields must be sealed in order to prevent leaks both to the external space around the electrochemical device and also between the spaces through which the various media flow.

The flow fields for the fluid media include structures comprising channels and webs, and these guide the medium concerned away over the level of the electrochemical unit. Each flow field is laterally delimited to the side by a web, called an edge web below, that runs peripherally around the outer edge of the flow field.

In the case of known electrochemical devices, a seal that seals off the flow field is applied to or assembled on the bipolar plate, at a spacing from the edge web. In this case, a gap, designated an edge channel below, is produced between the seal and the edge web.

Test results show that, during operation of the electrochemical device, parasitic flows of the medium through the edge channel can occur around the flow field and/or the edge channel can be at least partly flooded with water (see the article by P Stahl, J Biesdorf, P Boillat, J Kraft and K A Friedrich: "Water Distribution Analysis in the Outer Perimeter Region of Technical PEFC Based on Neutron Radiography", in: *Journal of the Electrochemical Society* 162(7), pages f677 to F685 (2015)). This produces an undefined supply of cathodic and/or anodic fluid to the membrane electrode assembly in the region of the edge channel, which can accelerate ageing of the membrane electrode assembly in its electrochemically active region.

Even if electrochemical reactions in the region of the edge channel are suppressed by the application of an edge reinforcing arrangement, the media that still flow through the edge channel are not available for an electrochemical reaction. Further, application of the edge reinforcing arrangement is associated with an increased cost for production and assembly.

SUMMARY OF THE INVENTION

The object of the present invention is to provide an electrochemical device of the type mentioned in the introduction in which at least one flow field is sealed off simply and reliably and the occurrence of parasitic flows is prevented.

This object is achieved according to the invention in the case of an electrochemical device having the features of the pre-characterizing clause of Claim 1, in that at least one bipolar plate has at least one edge web, which borders a flow field of the bipolar plate at least in certain areas and is in contact with a gas diffusion layer adjacent to the bipolar plate, wherein the electrochemical device further includes at least one flow field seal element that seals off the flow field bordered by the edge web and is in contact with the edge web and in contact with the gas diffusion layer.

The concept underlying the present invention is thus to attach the flow field seal element directly to the edge web that borders the flow field and to the gas diffusion layer that abuts against the edge web.

Preferably here, the edge web is formed to run continuously around the periphery of the flow field, and in particular has no breaks, lowered portions or apertures that would conduct a medium through the edge web.

Preferably, the gas diffusion layer and the flow field seal element are attached to the bipolar plate or to an individual layer of the bipolar plate together, in a single process step. Assembling the unit that comprises the bipolar plate, the gas diffusion layer and the flow field seal element in a single handling and positioning procedure minimizes the number and complexity of the required process steps and the number of handling and positioning procedures required therefor, and for this reason possible sources of error are also reduced.

In a preferred embodiment of the invention, it is provided for the flow field seal element to be connected to the edge web in a substance-to-substance bond.

Further, it is preferably provided for the flow field seal element to be connected to the gas diffusion layer in a substance-to-substance bond. In particular, it may be provided for the elastomer material that forms the flow field seal element to penetrate into the porous gas diffusion layer during production of the flow field seal element, in order to connect the gas diffusion layer to the flow field seal element in a substance-to-substance bond.

The flow field seal element may in particular take the form of an injection molded part that is formed onto the edge web and/or onto the gas diffusion layer.

As an alternative or in addition thereto, it may be provided for the flow field seal element to be produced on the edge web and/or the gas diffusion layer by a pattern printing method.

In a preferred embodiment of the invention, it is provided for the bipolar plate to have on its anode side an anode-side edge web and on its cathode side a cathode-side edge web, wherein the anode-side edge web and the cathode-side edge web are offset from one another at least in certain areas, in an offset direction running perpendicular to the stacking direction.

Here, it is in particular favorable if the bipolar plate has, in an intermediate region between the anode-side edge web and the cathode-side edge web, at least one aperture for a fluid medium to pass through the bipolar plate or into an interior of the bipolar plate.

An aperture of this kind is preferably in fluidic connection with a medium channel that extends through the bipolar plate in the stacking direction.

In the electrochemical device according to the invention, at least one membrane electrode assembly may be provided with an edge reinforcing arrangement (sub-gasket) against which the flow field seal element abuts in sealing manner.

As an alternative or in addition thereto, it may also be provided for two bipolar plates of the electrochemical device that succeed one another in the stacking direction to be provided on mutually facing sides with a respective edge web that is in contact with a respective flow field seal element, wherein the flow field seal elements with which the edge webs of the bipolar plates are in contact abut against one another in sealing manner.

Here, it may in particular be provided for the two bipolar plates that succeed one another in the stacking direction to take a substantially identical form but to be arranged rotated by an angle of 180° to one another about an axis of rotation that is parallel to the stacking direction.

At least one bipolar plate having an edge web that is in contact with a flow field seal element may include two bipolar plate layers that are joined to one another along join lines, preferably such that they are fluid-tight.

Here, it may in particular be provided for the bipolar plate layers to be joined to one another along join lines by welding and/or by adhesion.

In a particular embodiment of the invention, it is provided for the flow field seal element that is arranged on the bipolar plate not to overlap the join lines at which the bipolar plate layers of the bipolar plate are joined to one another—as seen in the stacking direction.

In particular, it is provided here for the flow field seal element not to cross the join lines nor to run above or below the join lines parallel to the latter, as seen in the stacking direction.

In a particular embodiment of the invention, it may be provided for the flow field seal element that is in contact with the edge web of a first bipolar plate and in contact with a first gas diffusion layer to abut in sealing manner against a further flow field seal element that is in contact with an edge web of a second bipolar plate opposite the first bipolar plate and in contact with a second gas diffusion layer.

As an alternative or in addition thereto, it may also be provided for the flow field seal element that is in contact with the edge web of a first bipolar plate and in contact with a first gas diffusion layer to extend as far as a second bipolar plate opposite the first bipolar plate and preferably to abut in sealing manner against the second bipolar plate opposite the first bipolar plate.

In this case, the flow field seal element preferably also seals off a flow field of the second bipolar plate, in addition to the flow field of the first bipolar plate that is bordered by the edge web of the first bipolar plate.

Here, it is preferably provided for the flow field seal element to be connected in a substance-to-substance bond with a cathode side of the first bipolar plate and to abut in sealing manner against an anode side of the second bipolar plate.

Here, it is not necessary for the flow field seal element to be in contact with an edge web of the second bipolar plate, or with a second gas diffusion layer that abuts against the second bipolar plate.

As an alternative or in addition to a configuration of this kind of the electrochemical device, it may also be provided for the flow field seal element that is in contact with the edge web of a first bipolar plate and with a first gas diffusion layer to abut in sealing manner against a further flow field seal element that is in contact with a second gas diffusion layer and abuts in sealing manner against a second bipolar plate that is opposite the first bipolar plate.

Here, it may in particular be provided for the first flow field seal element to be connected in a substance-to-substance bond with the first gas diffusion layer and for the further flow field seal element to be connected in a substance-to-substance bond with the second gas diffusion layer.

Here, the first flow field seal element is preferably in contact with a cathode side of the first bipolar plate, and the further flow field seal element preferably abuts in sealing manner against an anode side of the second bipolar plate.

The present invention further relates to a method for producing an electrochemical unit for an electrochemical device in which a plurality of electrochemical elements succeed one another in a stacking direction, wherein the electrochemical unit includes an electrochemically active membrane electrode assembly, at least one gas diffusion layer and a bipolar plate having at least one flow field for at least one fluid medium.

A further object of the present invention is to provide a method of this kind for producing an electrochemical unit, which is performable in a small number of process steps and with as few handling and positioning procedures necessary therefor as possible and yet enables reliable sealing of the flow field.

According to the invention, this object is achieved by a method that includes the following:

arranging the gas diffusion layer on the bipolar plate or on a bipolar plate layer of the bipolar plate;

producing a flow field seal element on the bipolar plate or the bipolar plate layer and on the gas diffusion layer such that the flow field seal element is in contact both with the bipolar plate or the bipolar plate layer and also with the gas diffusion layer.

Preferably in this case, the flow field seal element is produced on the bipolar plate or the bipolar plate layer, while the gas diffusion layer is arranged on the bipolar plate or the bipolar plate layer respectively.

In a preferred embodiment of the method according to the invention, it is provided for the bipolar plate to have at least one edge web, which borders a flow field of the bipolar plate at least in certain areas, wherein during production of the flow field seal element the gas diffusion layer is in contact with the edge web.

Further preferred features of the method according to the invention have already been explained above in the context of the particular embodiments of the electrochemical device according to the invention.

According to the invention, the gas diffusion layer and the flow field seal element are together attached to the bipolar plate or to a bipolar plate layer, in a single process step.

The edge web, which runs peripherally around the electrochemically active region of the electrochemical unit, is preferably formed to be continuous.

The edge web serves as an attachment surface for the gas diffusion layer.

The gas diffusion layer may partly or entirely cover the edge web and/or project outwardly beyond the edge web, that is to say outside the flow field.

Preferably, it is provided for the flow field seal element to entirely enclose an outer edge of the gas diffusion layer.

The flow field seal element may be arranged on an outer flank and/or a crest region of the edge web, on the upper side thereof.

By means of the edge web, a closed cavity may be formed, for producing the flow field seal element by an injection molding method.

As an alternative or in addition thereto, the edge web is available as a support surface for the production of the flow field seal element by an application method, for example by a pattern printing method, in particular a screen printing method, or by a OP (cured in place) method.

Preferably, it is provided for both sides of the bipolar plate—opposite one another as seen in the stacking direction—to be provided with a respective edge web.

The edge webs on the two sides of the bipolar plate (cathode-side edge web and anode-side edge web) are preferably arranged offset from one another in certain areas, in a plane at a right angle to the stacking direction.

This gives intermediate regions in the bipolar plate that lie between the two edge webs in a plane at a right angle to the stacking direction.

A medium stream for supplying or removing a fluid medium may be guided below an edge web in an intermediate region of this kind and through an aperture in the intermediate region, between the two edge webs, to the opposite side of the bipolar plate, where the flow field is arranged for the fluid medium concerned.

This makes it possible for the edge webs each to take a continuous and/or uninterrupted form and/or to have no passage openings.

A fluid medium, in particular a coolant, may be guided through the volume of an edge web and consequently be distributed over the width of the flow field.

In order to avoid one-sided supply of anodic fluid or cathodic fluid to an electrochemically active region of a membrane electrode assembly, which can contribute to accelerated ageing of the membrane electrode assembly, it may be provided for the membrane electrode assembly to be provided on its periphery with an edge reinforcing arrangement (sub-gasket), wherein the edge reinforcing arrangement is preferably arranged in the region of the mutually offset edge webs.

In a particular embodiment of the invention, it is provided for the bipolar plate, the flow field seal element and the gas diffusion layer to take a form such that the sealing lines of the flow field seal elements that lie on either side of a membrane electrode assembly and the lines along which the edge webs run lie substantially congruently on one another, as seen in the stacking direction.

The electrochemically active regions that are supplied with fluid media and are on either side of the membrane electrode assembly are in this case congruent, with the result that the use of an edge reinforcing arrangement to prevent an only one-sided supply of media to the electrochemically active region is not required.

In certain areas, the electrochemically active regions of two membrane electrode assemblies that are adjacent to one another in the stack are not congruent with one another, in the regions of medium supply and medium removal, as seen in the stacking direction. In these areas, the fluid media are supplied to the flow field for the respective medium via a level of the bipolar plate that is opposite the respective membrane electrode assembly and through an aperture in the bipolar plate.

The apertures in the bipolar plate for the supply or removal of a medium to two membrane electrode assemblies that are adjacent to one another in the stack are in this case arranged offset from one another in a direction at a right angle to the stacking direction.

In this embodiment of the electrochemical device, the bipolar plates, flow field seal elements, gas diffusion layers and membrane electrode assemblies of two mutually adjacent electrochemical units are of identical construction but are stacked on one another rotated by 180° to one another about an axis of rotation parallel to the stacking direction, in order to achieve the offset of the edge webs and the flow field seal elements in the region of the supply channels and removal channels for the media.

This allows a stack to be produced purely using bipolar plates of identical construction as like parts.

In this embodiment, a coolant in an intermediate level between two bipolar plate layers flows into the interior of a bipolar plate. The supply of coolant to the interior of the bipolar plate, and the removal of coolant from the interior of the bipolar plate, is in this case preferably performed using the mutual spacing of the two bipolar plate layers from one another, in a region in which the flow field seal element and the channel seal element of the coolant channel cross the flow path of the coolant.

A fluid medium, preferably a coolant, may flow through the at least one edge web in order in this way to distribute the fluid medium over the surface of the electrochemical unit.

So that more than one medium can be guided through the volume of the edge web into the flow field and distributed therein, the volume of the edge web may be subdivided by inlay elements.

Inlay elements of this kind may in particular be formed in one piece with a flow field seal element.

If the bipolar plate is formed from two bipolar plate layers, the bipolar plate layers may be sealed off from the surroundings at at least one of the bipolar plate layers by a joining method such as welding or adhesion or indeed by producing a seal, for example made from an elastomer material.

Seals of this kind may be produced on a first bipolar plate layer, a second bipolar plate layer or partly on the first bipolar plate layer and partly on the second bipolar plate layer.

The seals for sealing the interior of the bipolar plate may be produced in a joint process step together with production of the flow field seal elements.

Recesses, in particular in the form of grooves, in which the sealant is at least partly received may be provided in the bipolar plate layers, in order to enable the sealing volume required for the sealing effect to be accommodated.

In a particular embodiment of the invention, it is provided for the join lines along which the bipolar plate layers of a bipolar plate are joined to one another, such as weld seams or adhesive seams, not to be crossed or overlaid by sealing lines of the seal elements provided on the bipolar plate. This gives advantages in respect of the seal construction and the reliability of the process, in particular when welding methods are used for joining the bipolar plate layers.

If the bipolar plate layers are joined to one another by adhesion, overlaps between the join lines of the bipolar plate layers and the sealing lines of the seal elements provided on the bipolar plate layers are possible. This makes it possible in particular to make the region of media supply and media removal on the bipolar plate significantly more compact. Further, it is also possible to select a smaller offset between two membrane electrode assemblies that are adjacent to one another in the stack, in this region of media removal and media supply.

When the unit comprising the gas diffusion layer, the bipolar plate or bipolar plate layer and the flow field seal element is produced, preferably an outer peripheral area of the gas diffusion layer is brought into contact with the edge web on the bipolar plate or a bipolar plate layer.

The flow field seal element, preferably made from an elastomer material, is produced such that it is connected to the gas diffusion layer and the bipolar plate or bipolar plate layer in the region of the edge web directly and without a gap.

If the flow field seal element is produced by an injection molding method, a pressure edge of an injection mold may be laid on the gas diffusion layer, wherein the gas diffusion layer compensates for the tolerances of the injection mold by elastic or plastic deformation.

In the electrochemical device according to the invention and the production method according to the invention, an edge channel between the edge web and the flow field seal element is prevented from occurring by the direct arrangement of the flow field seal element on the edge web. This prevents an undefined supply of media to the electrochemically active region of the membrane electrode assembly and the associated effects on ageing, and it is possible to dispense with an edge reinforcing arrangement on the outer edge region of the membrane electrode assembly.

The present invention makes possible a very compact construction of the edge and sealing region of an electrochemical unit.

Further, the unit comprising the bipolar plate or bipolar plate layer, the gas diffusion layer and the flow field seal element may be assembled in the assembling process of the electrochemical device by a single handling and positioning procedure.

The membrane electrode assembly (with or without an edge reinforcing arrangement) may be provided in the form of a reel and be cut to length and assembled in a process step before assembly of the stack.

This significantly reduces the number and complexity of the required process steps and the number and complexity of the required handling and positioning procedures, and the assembling process becomes less susceptible to error.

During production of the flow field seal element, the edge web serves as a shaping and/or supporting structure.

The edge web may also serve to at least partly receive a seal element for sealing the interior of the bipolar plate off from the surroundings.

Inlay elements for subdividing the volume of an edge web into a plurality of areas that are configured for different media to flow through may be for example inserted parts, separately applied elements, or elements that are applied to the bipolar plate or a bipolar plate layer in a joint process step together with the flow field seal element.

On the bipolar plate or a bipolar plate layer there may be provided elements that serve to fix the gas diffusion layer temporarily to the bipolar plate or bipolar plate layer until the flow field seal element has been produced.

Fixing elements of this kind may be formed in one piece with the bipolar plate or bipolar plate layer, or indeed be parts formed separately from the bipolar plate or bipolar plate layer.

The gas diffusion layer may be fixed to the bipolar plate or bipolar plate layer for example by positive engagement, substance-to-substance bond or frictional engagement.

The elasticity required for sealing by means of the flow field seal element may be produced by using an elastomer material and/or by using a bead structure with a seal material arranged thereon. If a bead structure is used, the plastic deformation in a first pressing procedure means that macroscopic unevenness is compensated, and the seal, preferably made from an elastomer material, arranged on the bead structure means that microscopic unevenness is compensated.

The flow field seal element may take a flat form or a form that is profiled on its upper side remote from the bipolar plate, in order to lessen the sealing force required for the sealing effect.

If a plurality of flow field seal elements, for example a cathode-side flow field seal element and an anode-side flow field seal element, are provided on a bipolar plate, then these flow field seal elements may be constructed and produced in the same way or indeed be constructed and/or produced differently.

For example, a profiled flow field seal element may be produced on the one side of the bipolar plate, in particular by an injection molding method, while a flow field seal element of flat construction may be produced by means of a pattern printing method, in particular a screen printing method, on the opposite side of the bipolar plate.

If an injection molding method is used to produce the flow field seal element, the gas diffusion layer is preferably subjected to greater pressure by the pressure edge of the injection mold than during operation of the electrochemical device.

Preferably, the edge web has a sufficiently large support surface to enable the seal required during injection of the elastomer material to be made by means of the pressure edge of the injection mold.

If the bipolar plate is composed of a plurality of bipolar plate layers, then a gas diffusion layer may be attached and a flow field seal element produced on each bipolar plate layer separately, after which the bipolar plate layers may be joined to one another in a further step. In this case, when the flow field seal element is produced it is possible to support the bipolar plate layer, using a further injection mold, from the side of the bipolar plate layer opposite the seal element to be produced.

In principle, however, the at least one flow field seal element may also be produced on the bipolar plate that has already been joined together from a plurality of bipolar plate layers.

Here, the rigidity of the bipolar plate should be great enough to withstand the process forces occurring.

In this context, the gas diffusion layers and the flow field seal elements on the two mutually opposite sides of the bipolar plate may be applied in a joint process step or indeed sequentially one after the other.

Sequential application may be advantageous here if the flow field seal elements on the two mutually opposite sides of the bipolar plate can be applied using the same mould.

Preferably, a respective gas diffusion layer is attached on two mutually opposite sides of the bipolar plate by means of a flow field seal element.

In principle, however, it may also be provided for only one gas diffusion layer to be attached on one side of the bipolar plate by means of a flow field seal element, in which case the second gas diffusion layer is inserted separately on the opposite side of the bipolar plate at the time of the assembling procedure of the electrochemical device.

If a plurality of bipolar plate layers of a bipolar plate are joined to one another by a welding method, the bipolar plate layers may be welded to one another before or after the flow field seal elements have been produced if the flow field seal elements do not overlap with the weld seams. In this case, all the join points are still accessible from at least one side of the bipolar plate after the flow field seal elements have been produced.

If a plurality of bipolar plate layers are joined to one another by adhesion, the bipolar plate layers are preferably joined to one another after the flow field seal elements have been produced on the individual bipolar plate layers. In this case, the join lines may overlap—as seen in the stacking direction—with the flow field seal elements and with channel seal elements on the bipolar plate layers, which enables a significantly more compact structure of the bipolar plate in the region of the seal elements.

Further features and advantages of the invention form the subject matter of the description below and the illustrative representation of exemplary embodiments.

Figure 6:
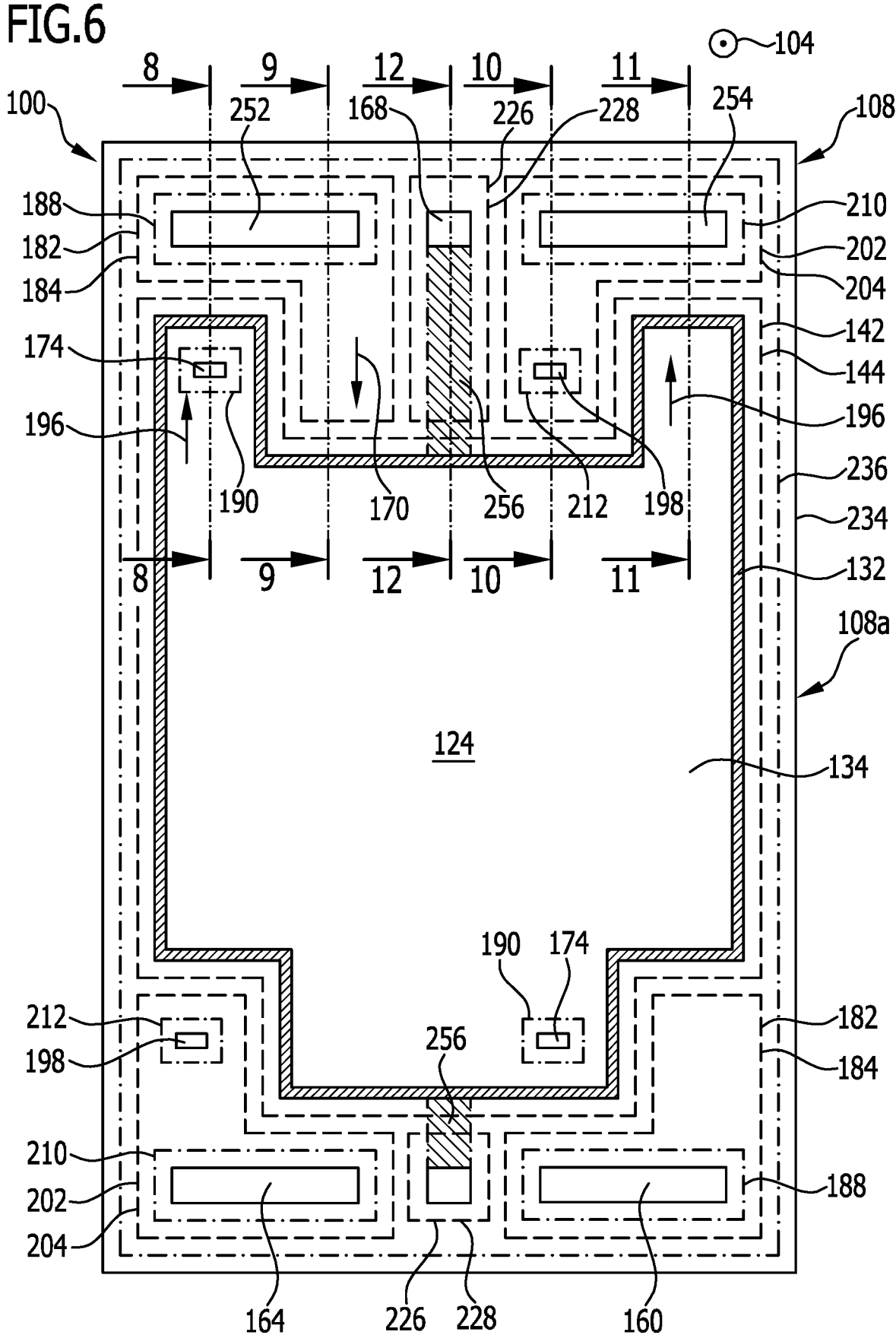
FIG. 6 shows a schematic plan view of the cathode side of a second embodiment of a bipolar plate of an electrochemical device that includes a plurality of electrochemical units succeeding one another in a stacking direction.
Figure 7:
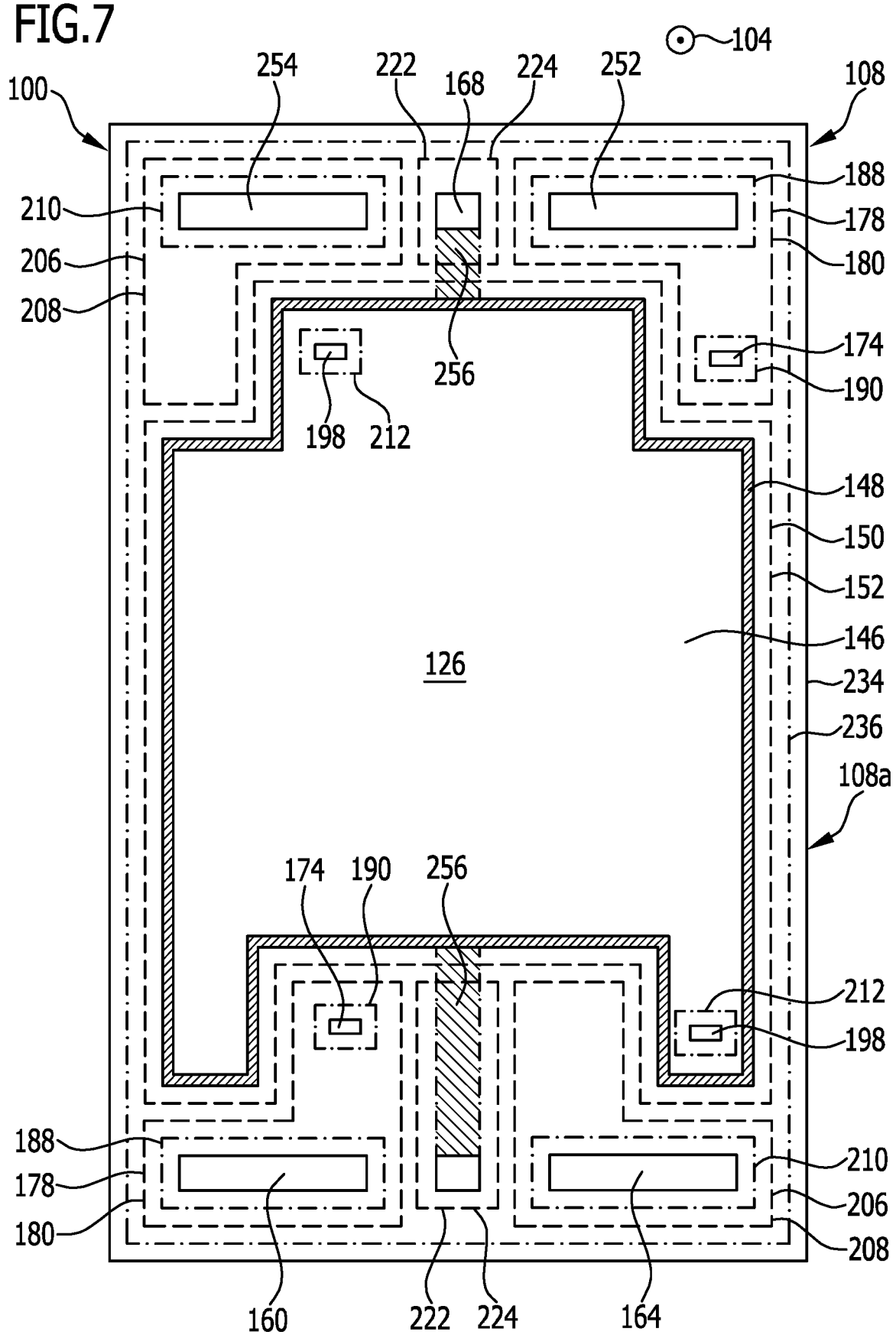
FIG. 7 shows a schematic plan view of the anode side of the bipolar plate from FIG. 6.
Figure 8:
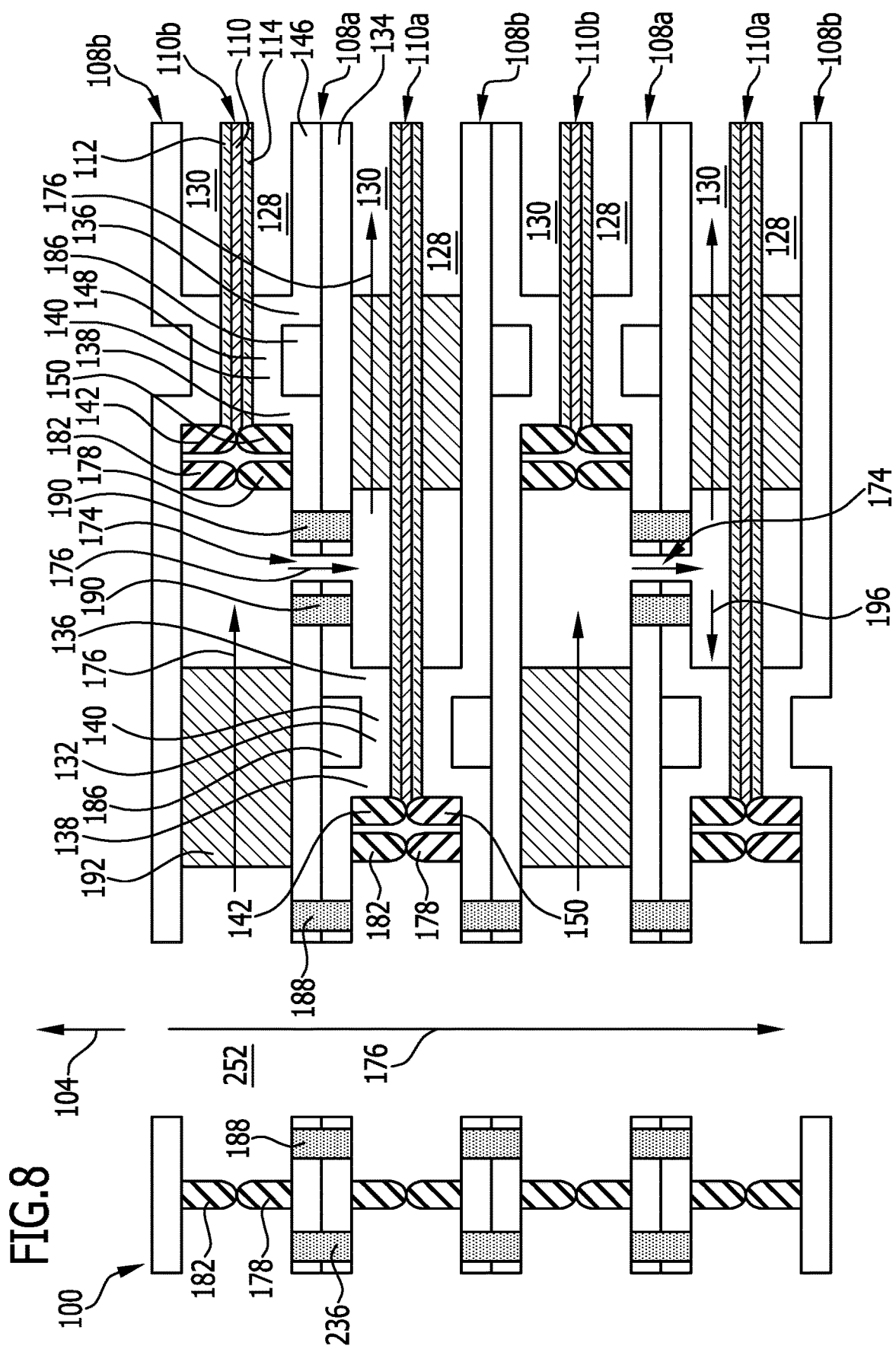
FIG. 8 shows a schematic section through the electrochemical device containing the bipolar plate from FIGS. 6 and 7, in a region of supply of a cathodic fluid to a first set of membrane electrode assemblies, along the line 8-8 in FIG. 6.
Figure 11:
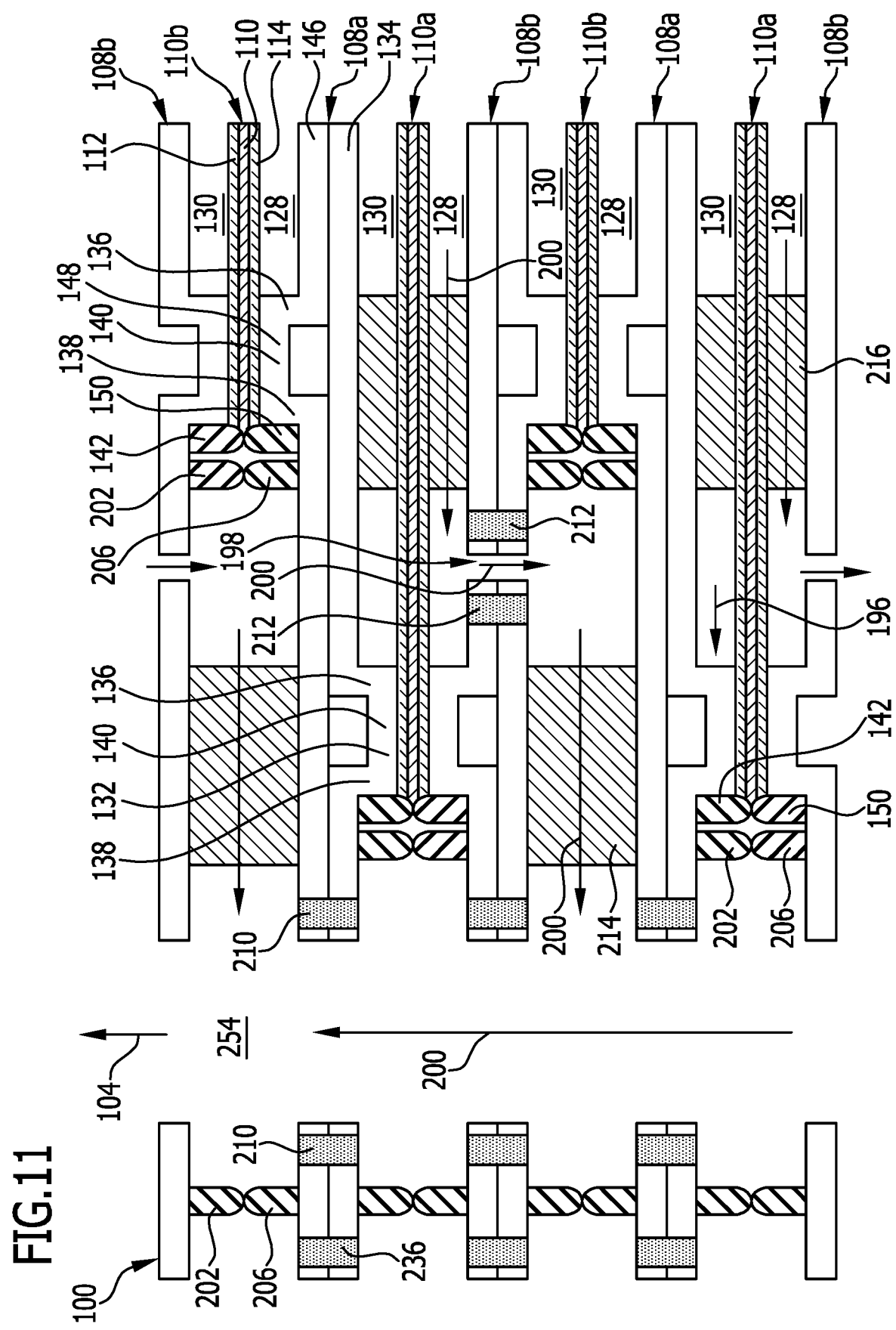
Figure 12:
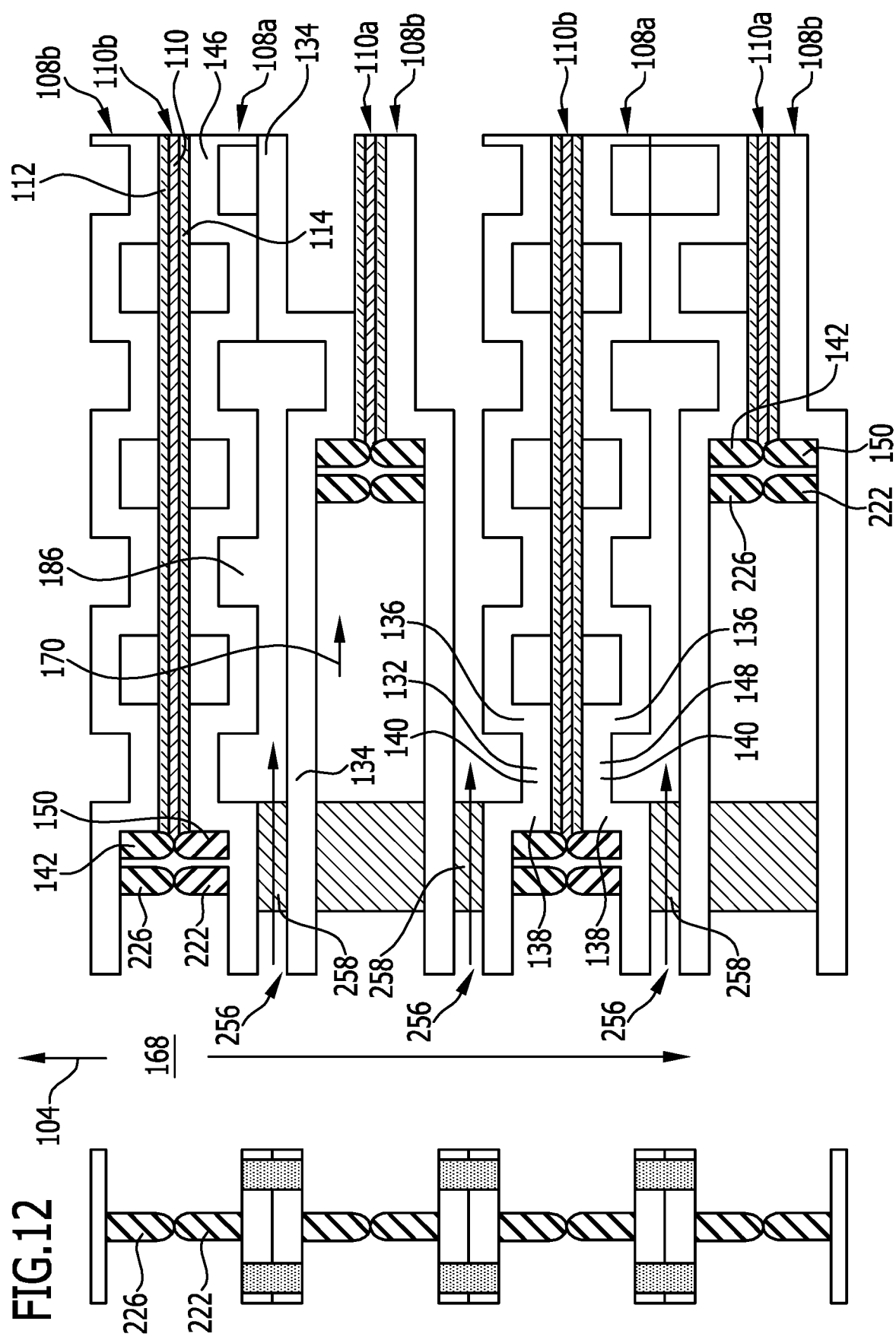
Figure 13:
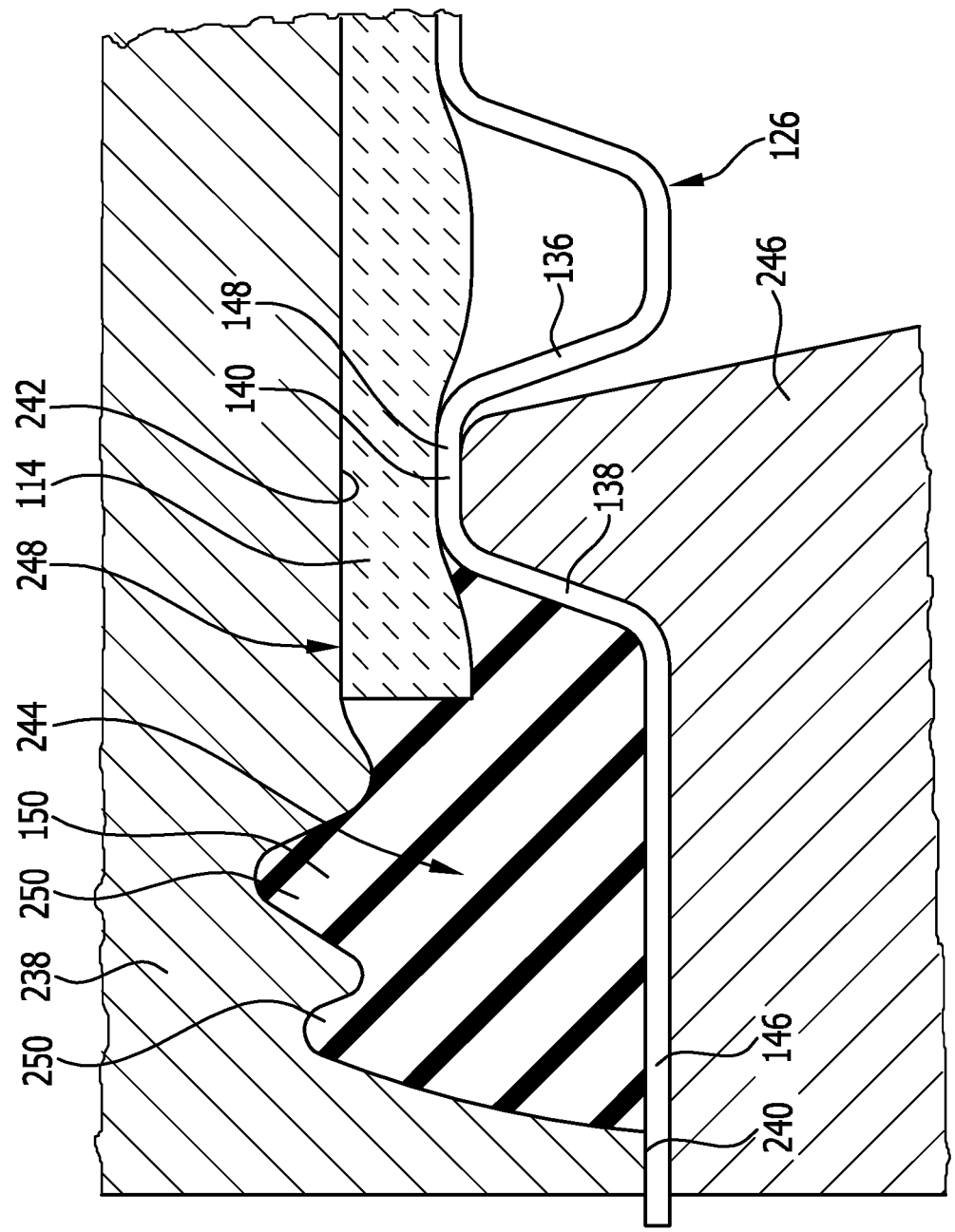
Figure 14:
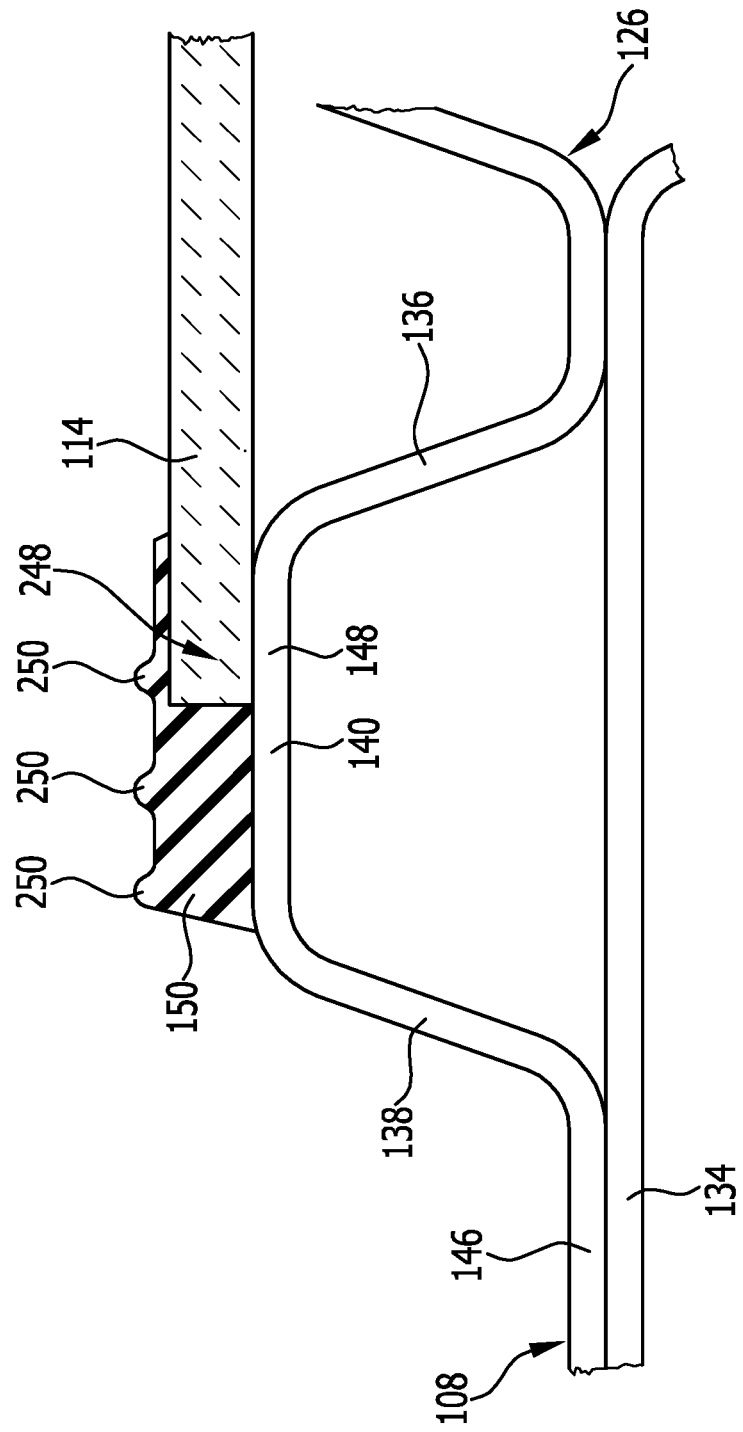
Figure 15:
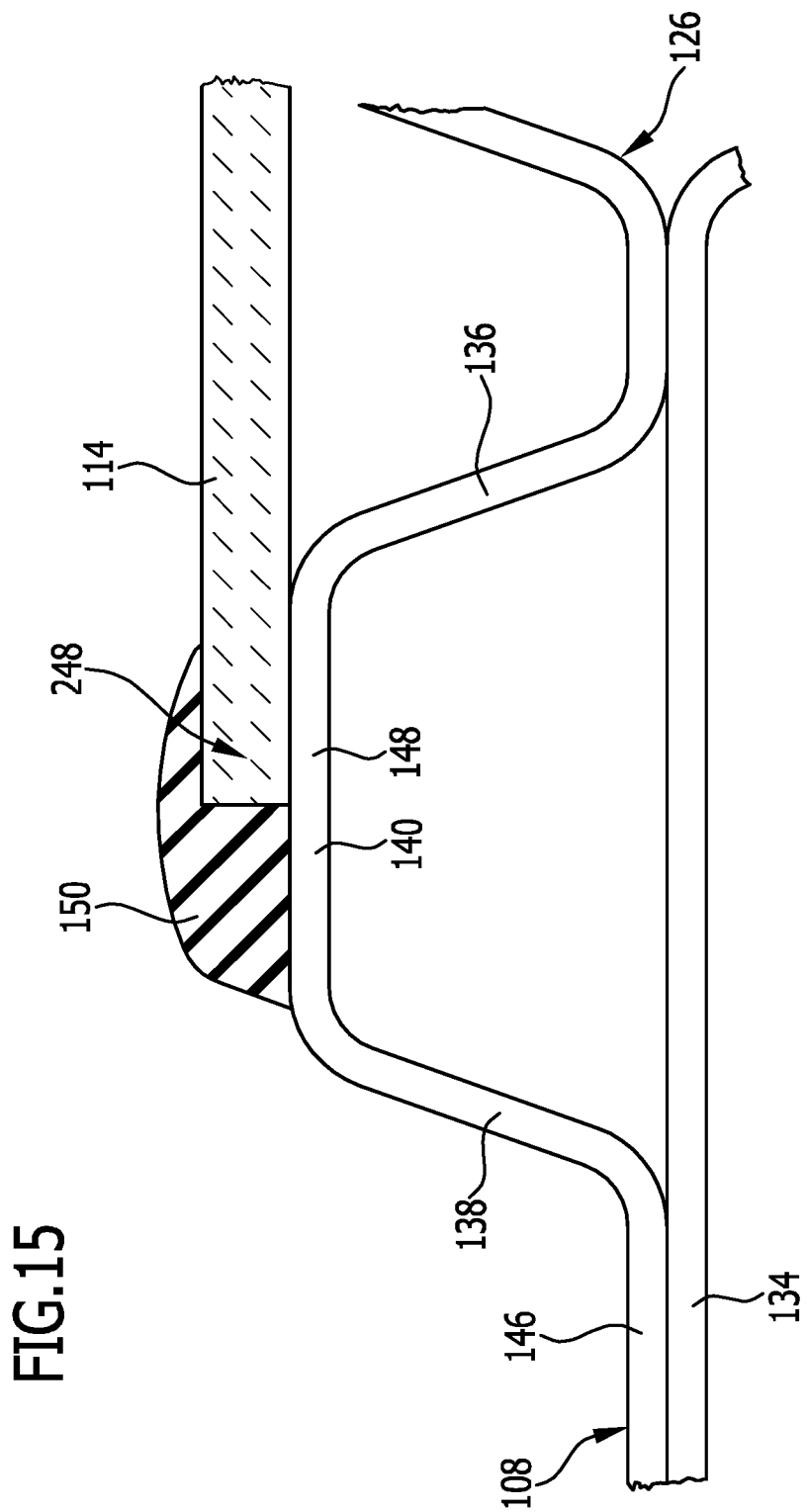
Figure 16:
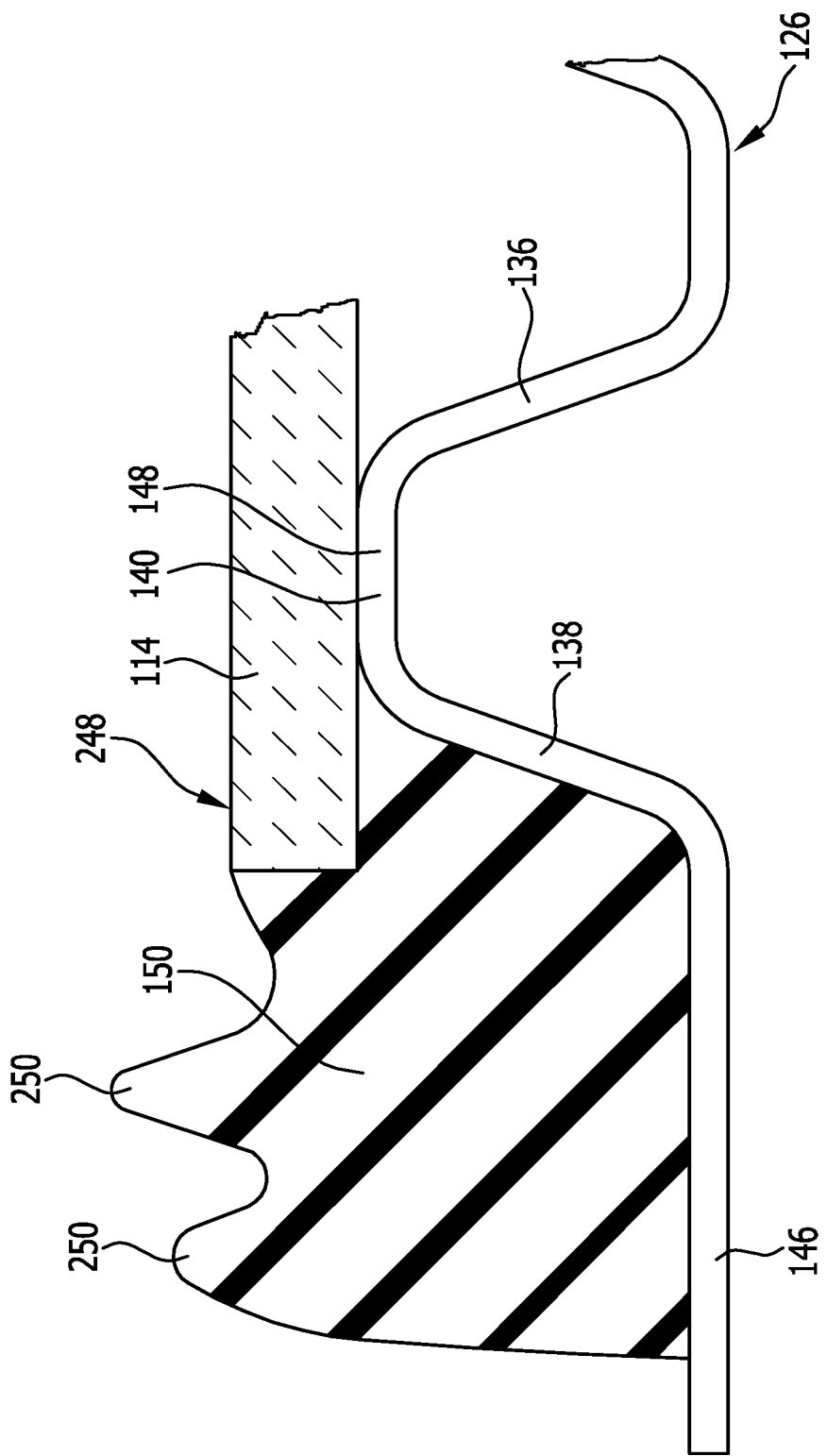
Figure 17:
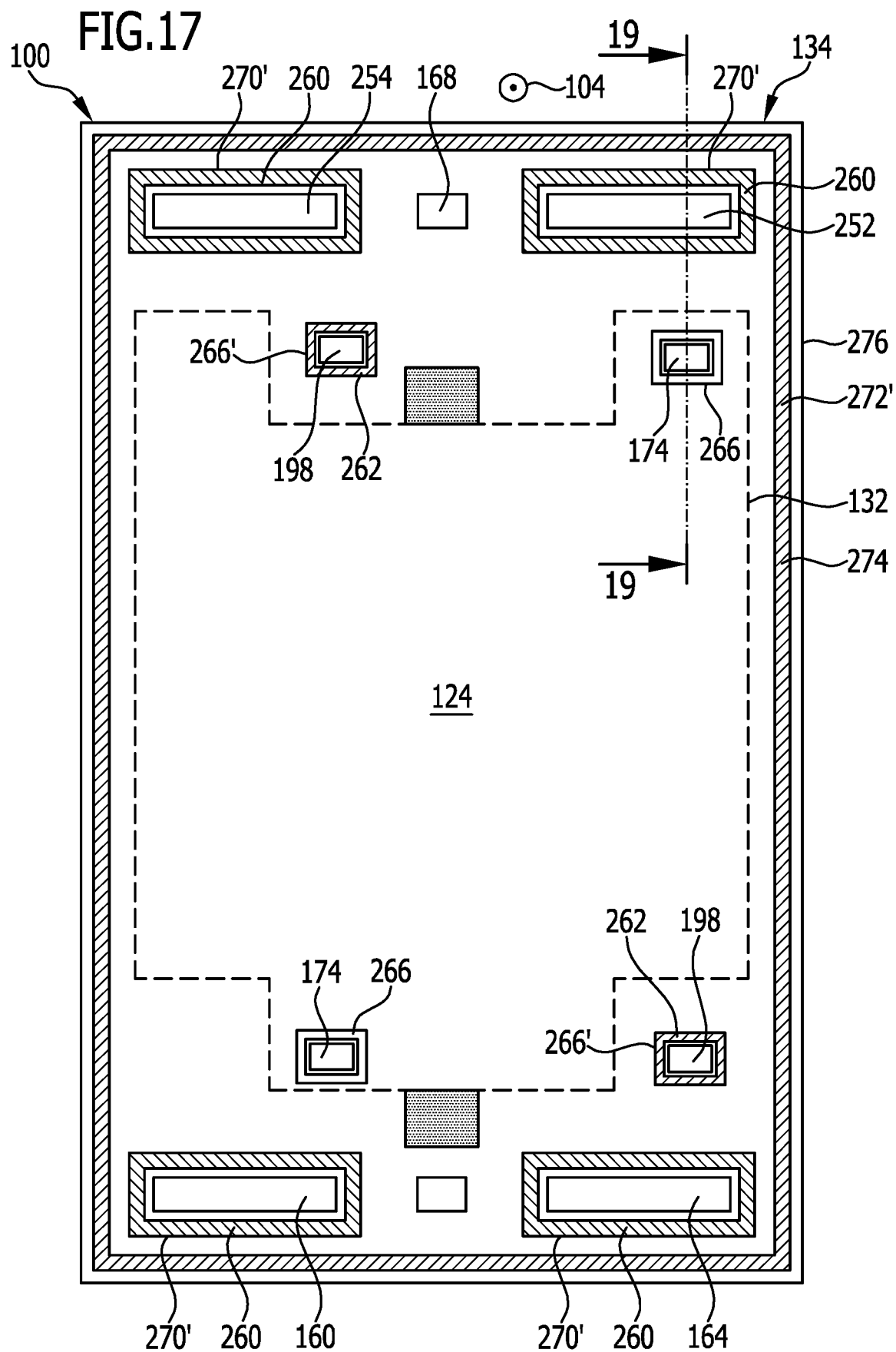
Figure 18:
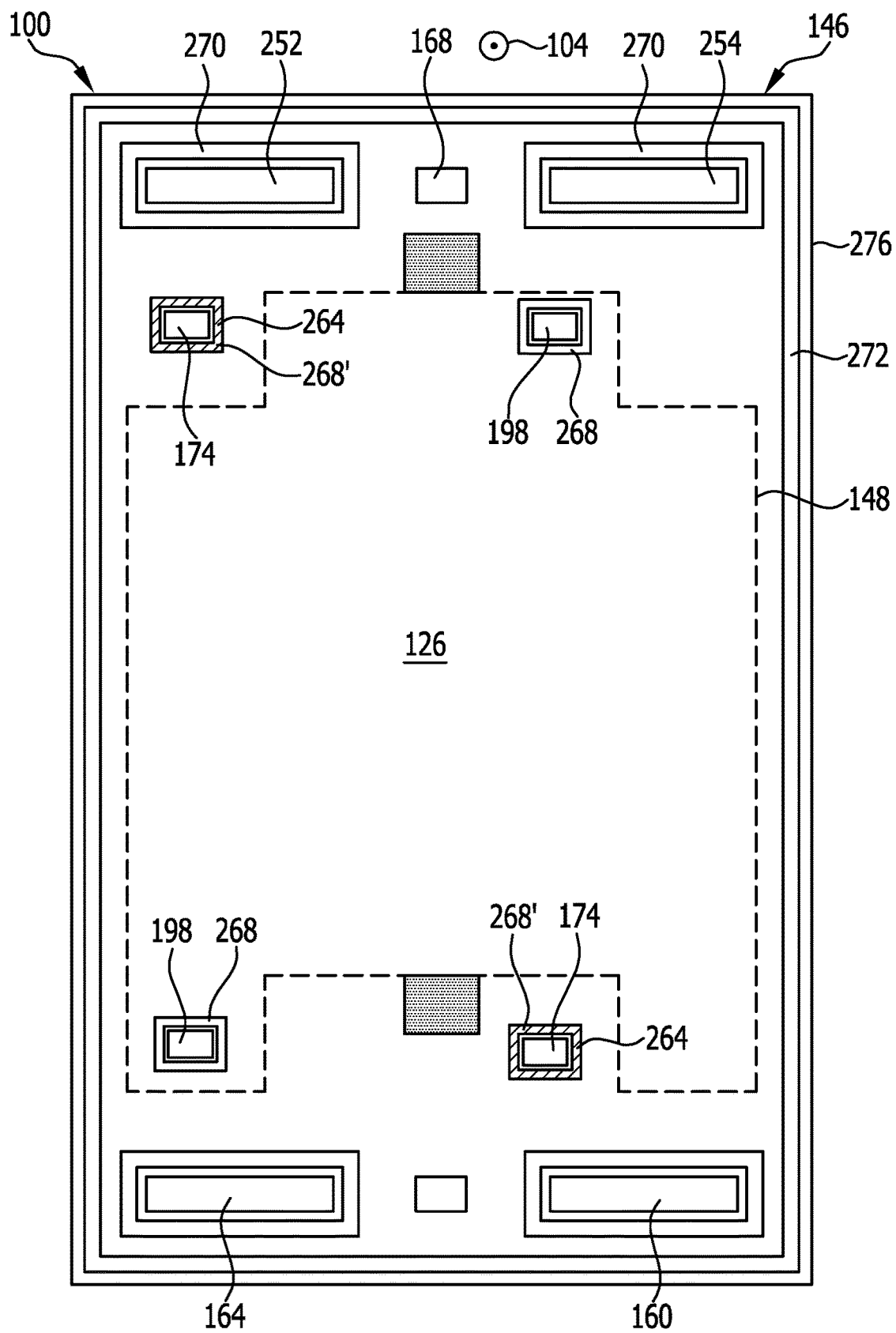
Figure 19:
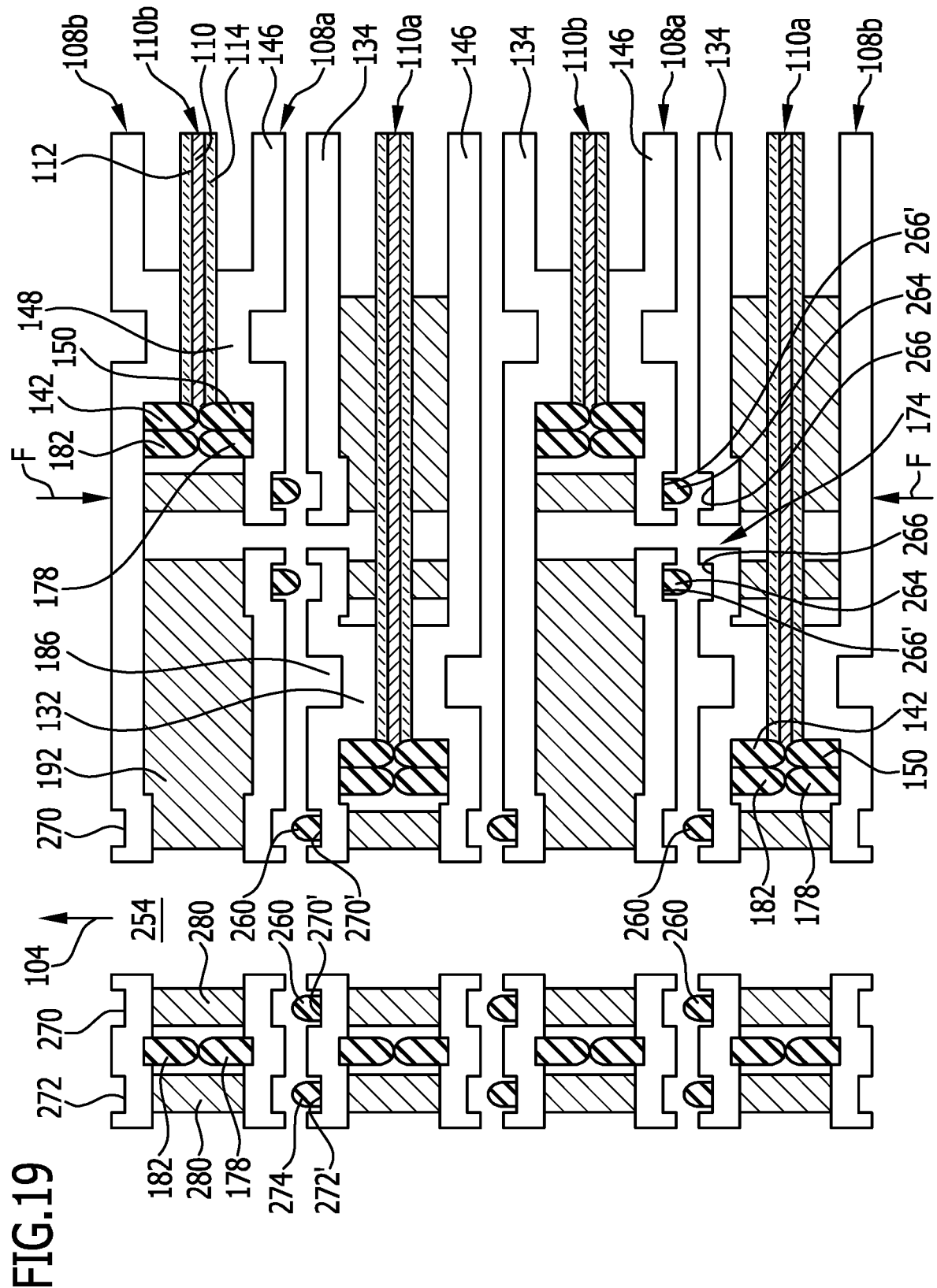
Figure 20:
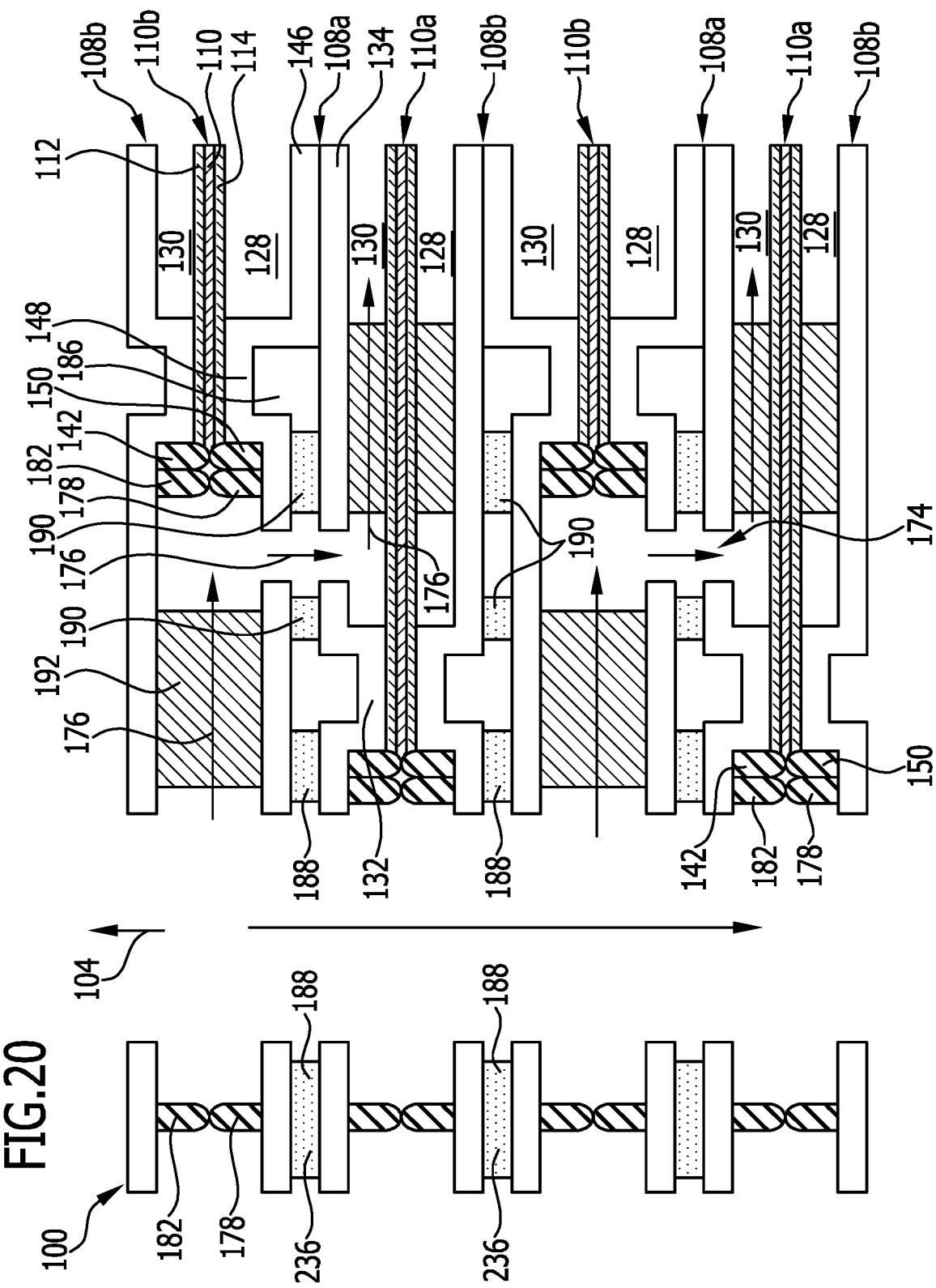
Figure 21:
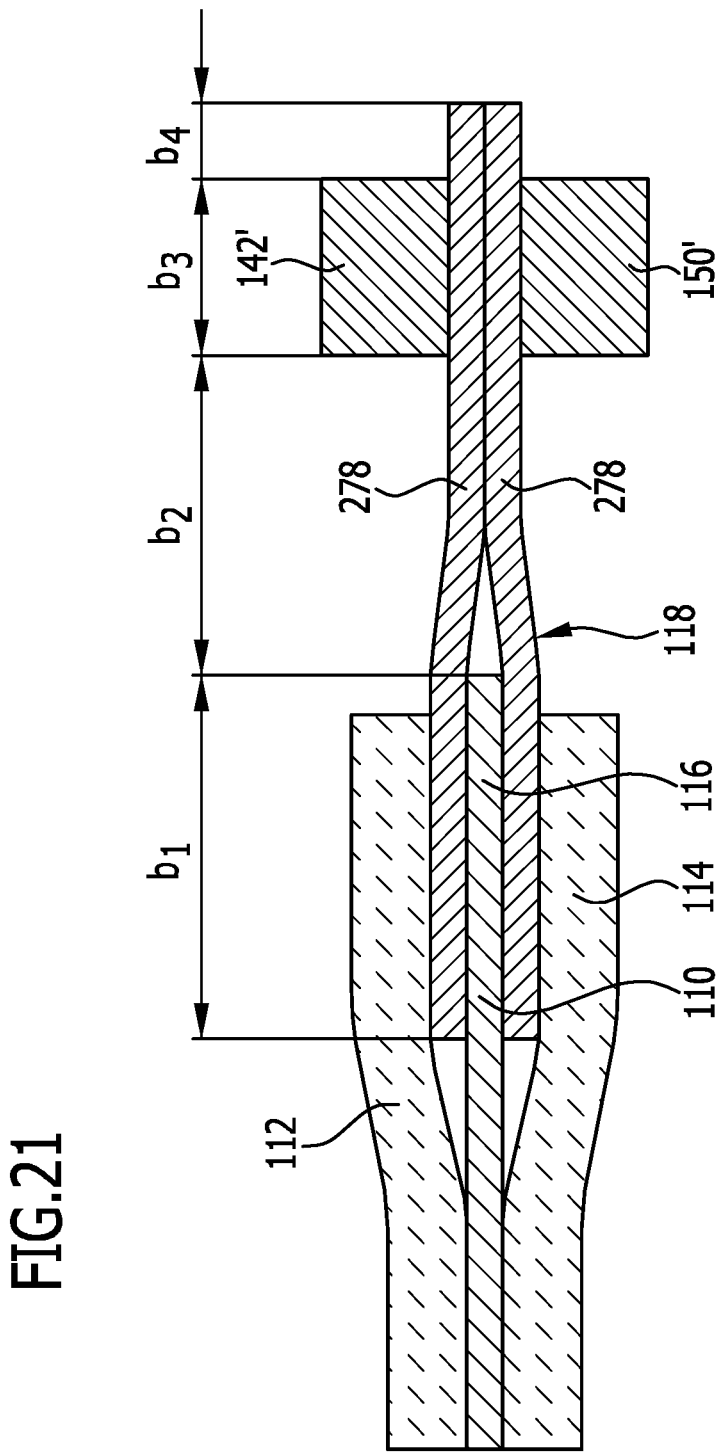
Figure 22:
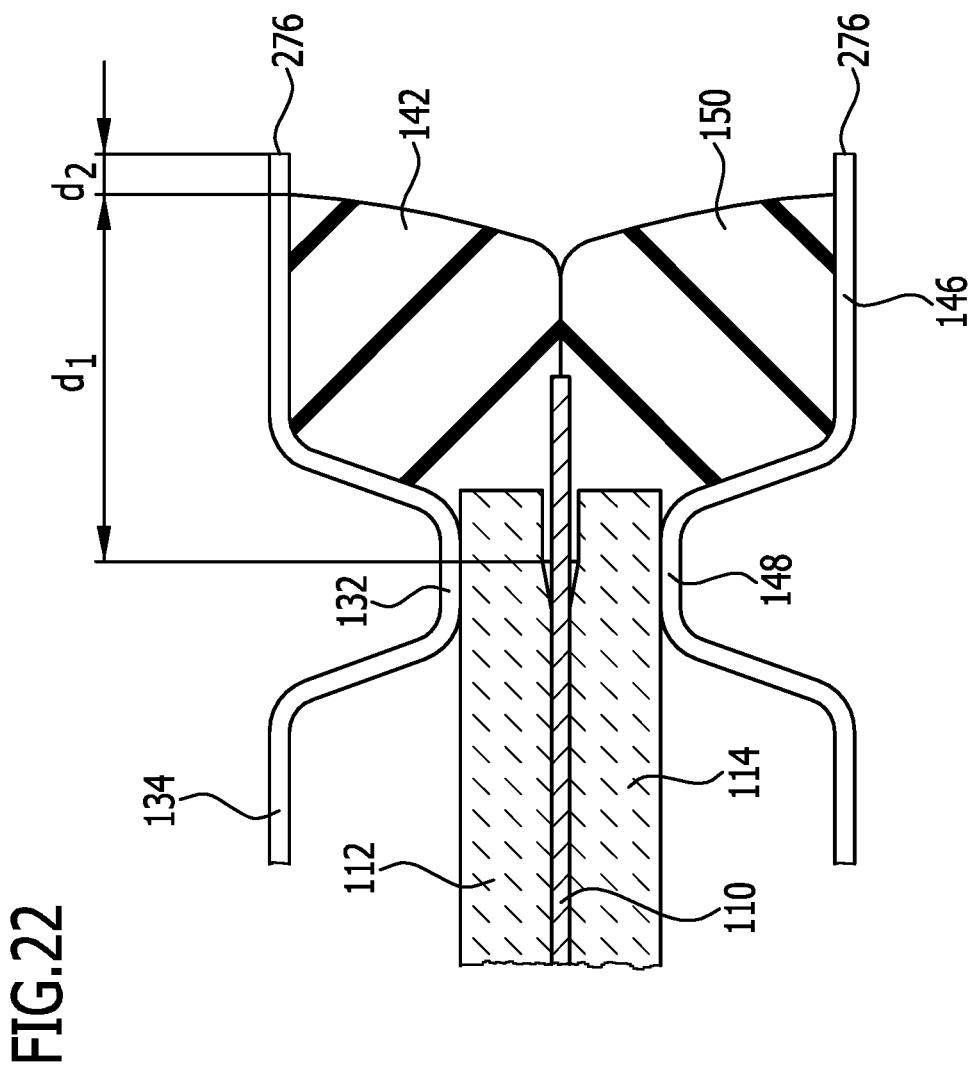
Figure 23:
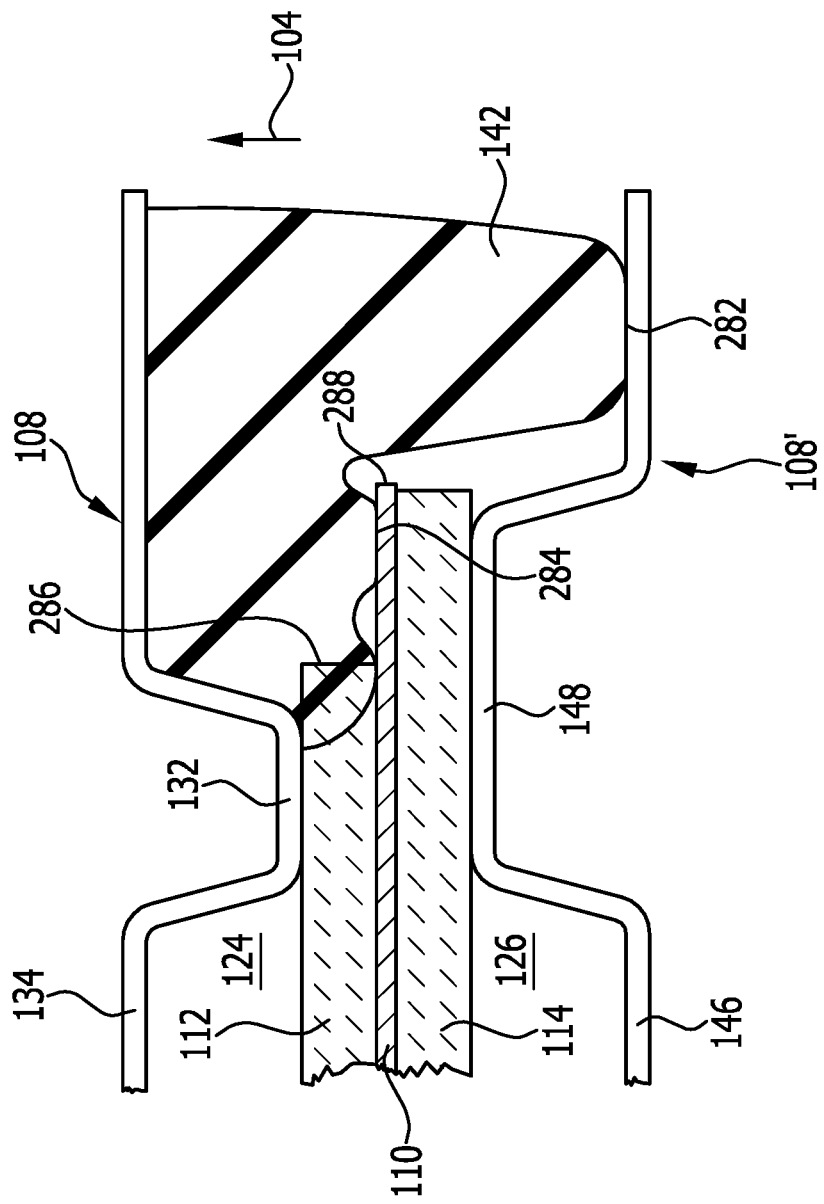
Figure 24:
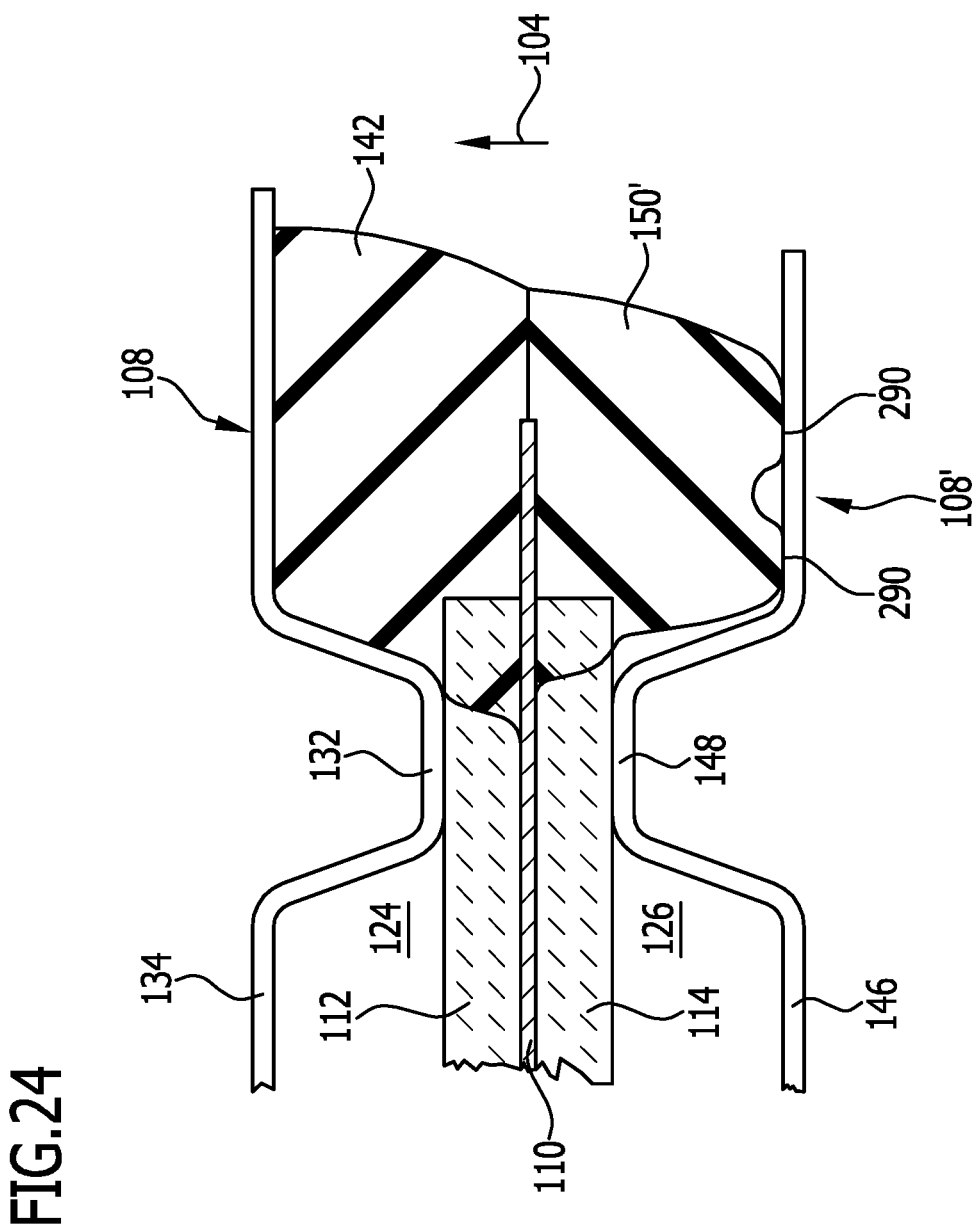

FIG. 11 shows a schematic section through the electrochemical device containing the bipolar plate from FIGS. 6 and 7, in a region of removal of an anodic fluid from the first set of membrane electrode assemblies, along the line 11-11 in FIG. 6;

FIG. 12 shows a schematic section through the electrochemical device containing the bipolar plate from FIGS. 6 and 7, in a region of coolant supply, along the line 12-12 in FIG. 6;

FIG. 13 shows a schematic section through a bipolar plate layer having an edge web, a gas diffusion layer in contact with the edge web, and a flow field seal element in contact with the edge web and with the gas diffusion layer, and mold parts of an injection mold for producing the flow field seal element;

FIG. 14 shows a schematic section through a bipolar plate having an edge web, a gas diffusion layer in contact with the edge web, and a flow field seal element that is in contact with the edge web and in contact with the gas diffusion layer and is provided with one or more sealing lips;

FIG. 15 shows a schematic section through a bipolar plate having an edge web, a gas diffusion layer in contact with the edge web, and a flow field seal element that is in contact with the edge web and in contact with the gas diffusion layer and takes the form of a CIP (cured in place) bead;

FIG. 16 shows a schematic section through a bipolar plate layer having an edge web, a gas diffusion layer in contact with the edge web, and a flow field seal element that is in contact with the edge web and in contact with the gas diffusion layer and was produced by injection molding;

FIG. 17 shows a schematic plan view of the inner, coolant side of a cathode-side bipolar plate layer of a third embodiment of a bipolar plate;

FIG. 18 shows a schematic plan view of the inner, coolant side of an anode-side bipolar plate layer of the third embodiment of a bipolar plate;

FIG. 19 shows a schematic section through the electrochemical device containing the bipolar plate layers from FIGS. 17 and 18, along the line 19-19 in FIG. 17, wherein in the fully assembled condition of the bipolar plate cathode-side and anode-side bipolar plate layers that are joined to one another are illustrated spaced from one another in the stacking direction in order to demonstrate that the coolant seal elements in the interior of the bipolar plate are each connected in a substance-to-substance bond to only one of the bipolar plate layers;

FIG. 20 shows a schematic section, corresponding to FIG. 8, through an electrochemical device that contains a fourth embodiment of a bipolar plate, in which the cathode-side bipolar plate layer and the anode-side bipolar plate layer are not joined to one another by welding but by adhesion, in a region of supply of a cathodic fluid to a first set of membrane electrode assemblies;

FIG. 21 shows a schematic section through an edge region of a membrane electrode assembly that is provided with an edge reinforcing arrangement comprising two edge reinforcing layers, and through two gas diffusion layers and two flow field seal elements that are arranged on the edge reinforcing arrangement at a spacing from the gas diffusion layers, as in the prior art;

FIG. 22 shows a schematic section through an edge region of a membrane electrode assembly, two gas diffusion layers, two bipolar plate layers each having an edge web, and two flow field seal elements that are in contact with a respective edge web and a respective gas diffusion layer, according to the invention;

FIG. 23 shows a schematic section through an edge region of a membrane electrode assembly, two gas diffusion layers, two bipolar plate layers each having an edge web, and a flow field seal element that is in contact with a first edge web of a first bipolar plate and in contact with a first gas diffusion layer, extends from the first bipolar plate to a second bipolar plate opposite the first bipolar plate and abuts in sealing manner against the latter; and FIG. 24 shows a schematic section through an edge region of a membrane electrode assembly, two gas diffusion layers, two bipolar plate layers each having an edge web, and two flow field seal elements, wherein a first flow field seal element is in contact with a first edge web of a first bipolar plate and in contact with a first gas diffusion layer and abuts in sealing manner against the second flow field seal element, which for its part is in contact with the second gas diffusion layer and abuts in sealing manner against the second bipolar plate opposite the first bipolar plate but is at a spacing from the second edge web of the second bipolar plate.

Like or functionally equivalent elements are designated by the same reference numerals in all the Figures.

DETAILED DESCRIPTION OF THE INVENTION

An electrochemical device that is illustrated in FIGS. 1 to 5 and is designated 100 as a whole, for example a fuel cell stack or an electrolyzer, includes a stack that includes a plurality of electrochemical units 106 succeeding one another in a stacking direction 104, for example fuel cell units or electrolysis units, and a clamping device (not illustrated) for applying a clamping force, directed in the stacking direction 104, to the electrochemical units.

Figure 3:
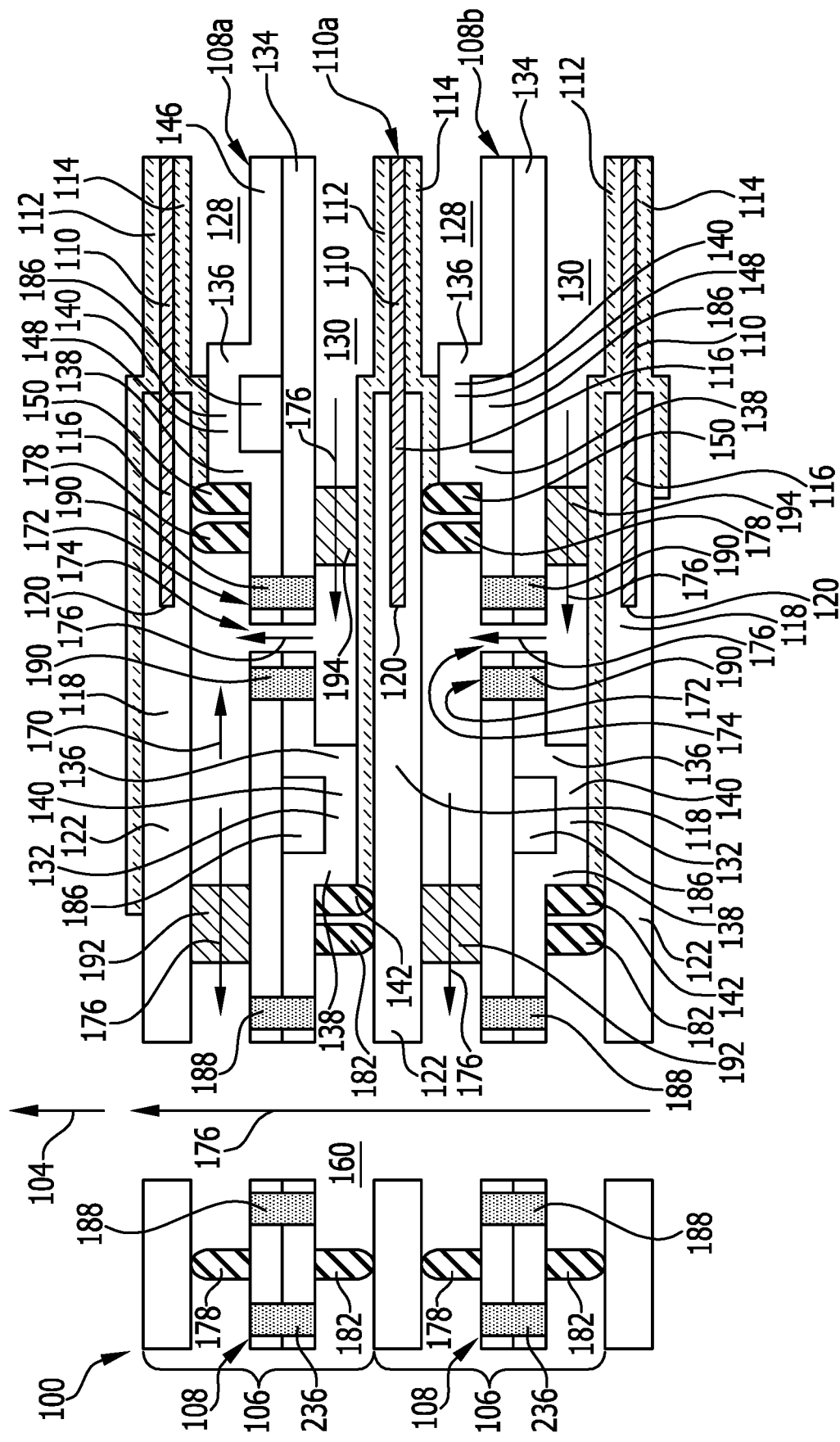
FIG. 3 shows a schematic longitudinal section through the electrochemical device containing the bipolar plate from FIGS. 1 and 2, in a region of removal of a cathodic fluid, along the line 3-3 in FIG. 1.
Figure 4:
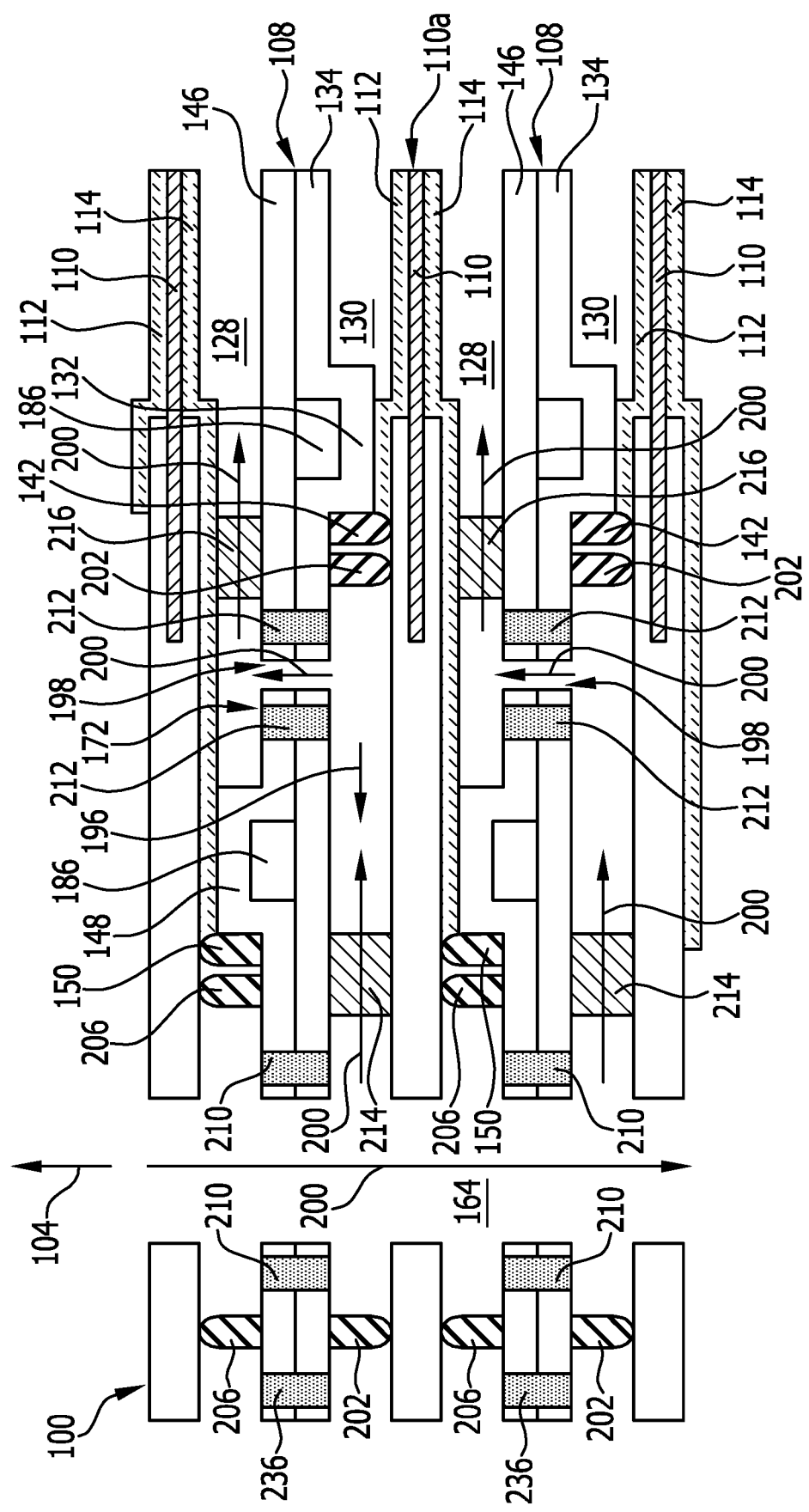
FIG. 4 shows a schematic longitudinal section through the electrochemical device containing the bipolar plate from FIGS. 1 and 2, in a region of supply of an anodic fluid, along the line 4-4 in FIG. 1.
Figure 5:
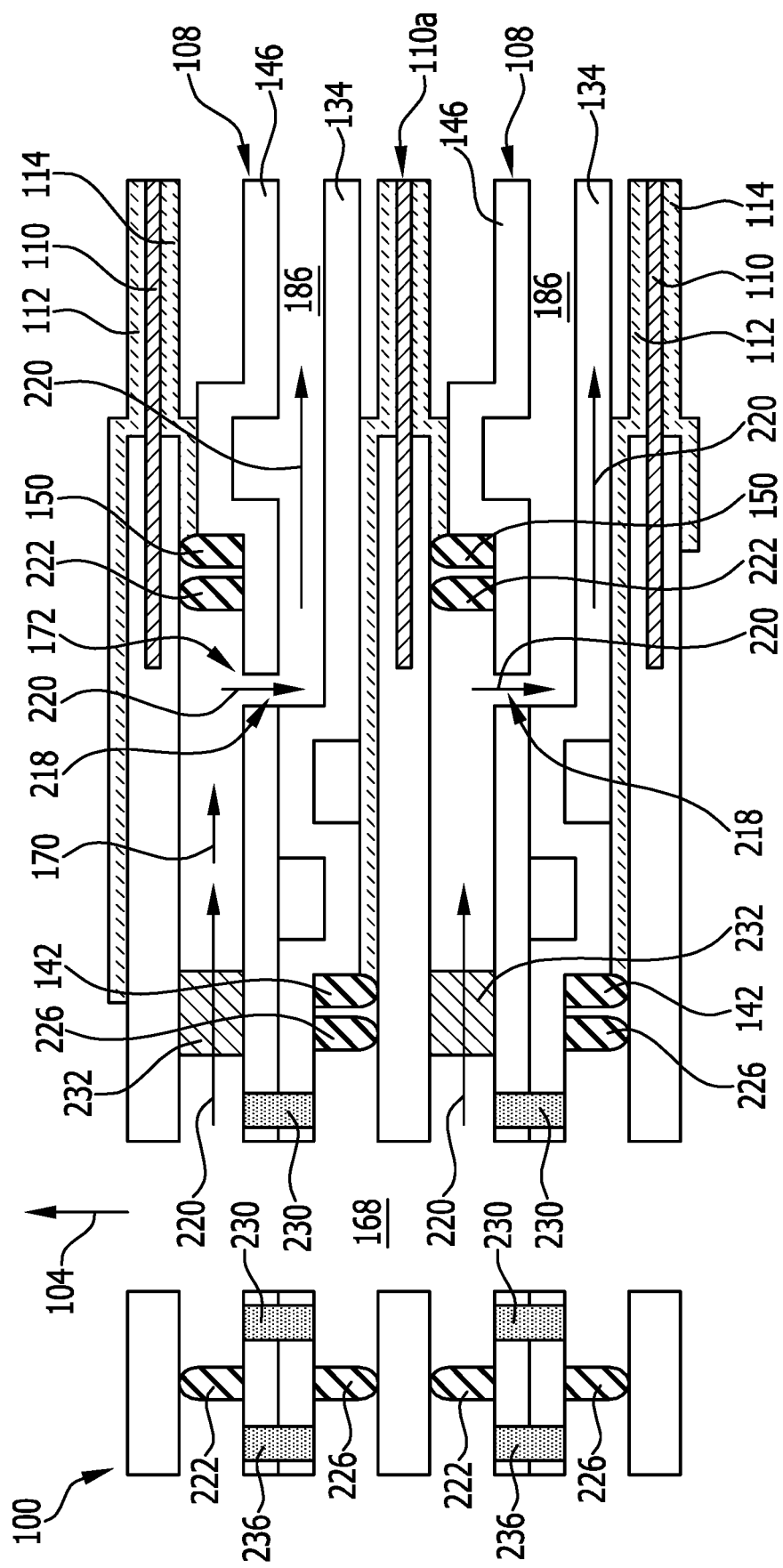
FIG. 5 shows a schematic longitudinal section through the electrochemical device containing the bipolar plate from FIGS. 1 and 2, in a region of coolant supply, along the line 5-5 in FIG. 1.

As can best be seen from FIGS. 3 to 5, each electrochemical unit 106 of the electrochemical device 100 includes respectively a bipolar plate 108, a membrane electrode assembly (MEA) 110, a cathode-side gas diffusion layer 112 that is arranged on the cathode side of the membrane electrode assembly 110, and an anode-side gas diffusion layer 114 that is arranged on the anode side of the membrane electrode assembly 110.

In the embodiment of the electrochemical device 100 that is illustrated in FIGS. 1 to 5, each membrane electrode assembly 110 is provided on its outer edge region 116 with an edge reinforcing arrangement 118 that is attached to the membrane electrode assembly 110 preferably in a substance-to-substance bond, in particular by hot lamination and/or adhesion.

The edge reinforcing arrangement 118 is also designated a sub-gasket.

An edge reinforcing arrangement 118 of this kind may for example include two edge reinforcing layers, in particular in the form of edge reinforcing films, wherein a cathode-side edge reinforcing layer abuts against the cathode side of the membrane electrode assembly 110, while an anode-side edge reinforcing layer abuts against the anode side of the membrane electrode assembly 110, and the two edge reinforcing layers are fixed to one another, preferably in a substance-to-substance bond, in particular by hot lamination and/or adhesion, in a projecting region 122 that projects beyond an outer edge 120 of the membrane electrode assembly 110.

In FIGS. 3 to 5, the edge reinforcing layers of the edge reinforcing arrangement 118 are illustrated only as a unit and not separately, for the sake of simplified illustration.

Each of the edge reinforcing layers of the edge reinforcing arrangement 118 may be formed by a thermoplastic, thermoset or elastomeric polymer, which preferably includes a polytetrafluoroethylene, a polyvinylidene fluoride, a polyester, a polyamide, a co-polyamide, a polyamide elastomer, a polyimide, a polyurethane, a polyurethane elastomer, a silicone, a silicone rubber and/or a silicone-based elastomer.

The membrane electrode assembly 110 includes a cathode facing the cathode-side gas diffusion layer 112, an anode facing the anode-side gas diffusion layer 114, and an electrolyte membrane that is arranged between the cathode and the anode, in particular a polymer electrolyte membrane.

This three-layer construction of the membrane electrode assembly 110 is not illustrated in the drawings, for reasons of simplification.

The cathode-side gas diffusion layer 112 is formed from a gas-permeable material and serves for the passage of a cathodic fluid, in particular an oxidant, out of the channels of a cathode-side flow field 124 of a bipolar plate 108a, which is adjacent to the membrane electrode assembly 110, follows the membrane electrode assembly 110a as seen in the stacking direction 104, and is in contact with the cathode-side gas diffusion layer 112, and to the cathode of the membrane electrode assembly 110.

The anode-side gas diffusion layer 114 is likewise formed from a gas-permeable material and serves for the passage of an anodic fluid, in particular a fuel gas, out of the channels of an anode-side flow field 126 of a bipolar plate 108b, which is arranged below the membrane electrode assembly 110 as seen in the stacking direction 104 and is in contact with the anode-side gas diffusion layer 114, and to the anode of the membrane electrode assembly 110.

The anode-side gas diffusion layer 114 and the adjacent bipolar plate 108b together enclose an anode-side fluid chamber 128 of the electrochemical unit 106.

The cathode-side gas diffusion layer 112 and the bipolar plate 108a adjacent thereto together enclose a cathode-side fluid chamber 130 of the electrochemical unit 106.

Figure 2:
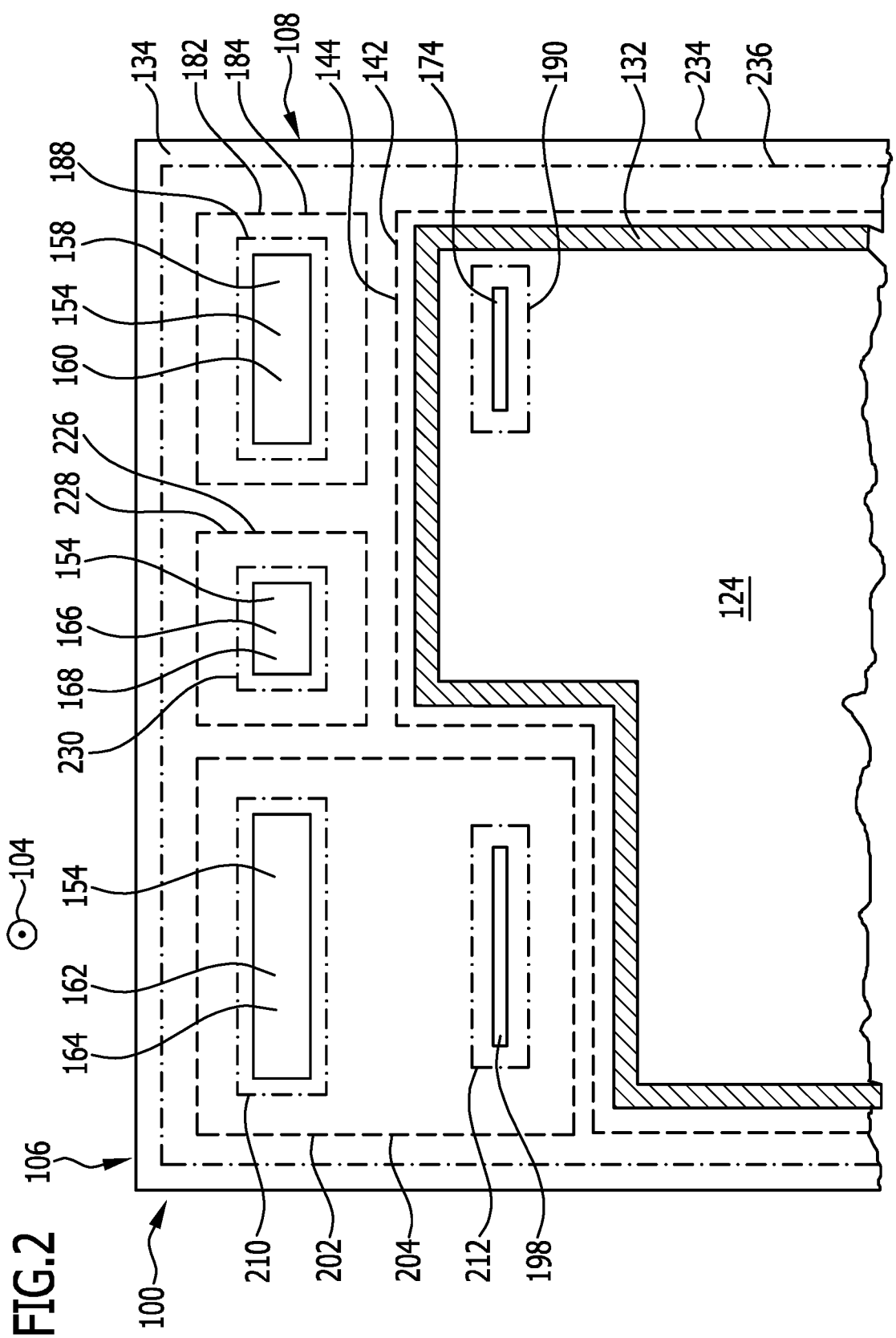
FIG. 2 shows a detail schematic plan view from below of a cathode side of the bipolar plate from FIG. 1, which shows the same region of media supply or media removal and a detail of an opposite cathode-side flow field.

As can best be seen from FIG. 2, the cathode-side flow field 124 of each bipolar plate is bordered by a cathode-side edge web 132 that preferably takes a continuous form and encloses the entire cathode-side flow field 124.

As can be seen for example from FIG. 3, the cathode-side edge web 132 is for example in the form of a bead on a cathode-side bipolar plate layer 134 of the bipolar plate 108.

The edge web 132 may in particular include an inner flank 136 facing the flow field 124, an outer flank 138 remote from the flow field 124, and a crest region 140 that connects the outer flank 138 to the inner flank 136.

The bipolar plate 108 is preferably formed from an elastically and/or plastically deformable metal material.

In order to seal off the cathode-side flow field 124 and the cathode-side fluid chamber 130 so that they are fluid-tight towards the outside, a cathode-side flow field seal element 142 is arranged on the cathode side of the bipolar plate 108 and extends around the cathode-side edge web 132 and the cathode-side flow field 124 along a sealing line 144.

The flow field seal element 142 is in contact with the cathode-side edge web 132 and in contact with the cathode-side gas diffusion layer 112, which abuts against the crest region 140 of the cathode-side edge web 132 and extends beyond the latter as far as the cathode-side flow field seal element 142.

Preferably, the cathode-side flow field seal element 142 is connected in a substance-to-substance bond with the cathode-side edge web 132, preferably with the outer flank 138 thereof, and in a substance-to-substance bond with the cathode-side gas diffusion layer 112.

In the assembled condition of the electrochemical device 100, the cathode-side flow field seal element 142 abuts in a fluid-tight sealing manner against the edge reinforcing arrangement 118 which is fixed to the membrane electrode assembly 110 against which there abuts the cathode-side gas diffusion layer 112 with which the cathode-side flow field seal element 142 is in contact.

The anode-side flow field 126 of the bipolar plate 108 is bordered by an anode-side edge web 148 that may in particular take the form of a bead on an anode-side bipolar plate layer 146 of the bipolar plate 108 and preferably extends continuously around the anode-side flow field 126.

The anode-side edge web 148 preferably takes a form that has substantially the same cross section as the cathode-side edge web 132 and may in particular include an inner flank 136 facing the anode-side flow field 126, an outer flank 138 remote from the anode-side flow field 126, and a crest region 140 that connects the outer flank 138 to the inner flank 136.

For the purpose of sealing off the anode-side flow field 126 and the anode-side fluid chamber 128 from the outside, an anode-side flow field seal element 150 is provided on the anode-side bipolar plate layer 146 and extends around the anode-side edge web 148 and the anode-side flow field 126 along a sealing line 152.

The anode-side flow field seal element 150 is in contact with the anode-side edge web 148, in particular with the outer flank 138 thereof, and in contact with the anode-side gas diffusion layer 114, which extends beyond the crest region 140 of the anode-side edge web 148 as far as the anode-side flow field seal element 150.

Preferably, the anode-side flow field seal element 150 is connected in a substance-to-substance bond with the anode-side edge web 148 and with the anode-side gas diffusion layer 114.

The anode-side flow field seal element 150 abuts in a fluid-tight sealing manner against the edge reinforcing arrangement 118 which is fixed to the membrane electrode assembly 110 against which there abuts the anode-side gas diffusion layer 114 with which the anode-side flow field seal element 150 is in contact.

The mutually opposite end regions of each bipolar plate 108 have a plurality of medium passage openings 154 through which a respective fluid medium that is to be supplied to the electrochemical device 100 (in particular a cathodic fluid that is to be supplied to the cathode of the membrane electrode assemblies 110, an anodic fluid that is to be supplied to the anode of the membrane electrode assemblies 110, or a coolant) can pass through the bipolar plate 108.

The medium passage openings 154 of the bipolar plates 108 that succeed one another in the stack, and the intermediate spaces that lie between the medium passage openings 154 in the stacking direction 104, together form a respective medium channel 156.

Associated with each medium channel 156 through which a fluid medium of the electrochemical device 100 is suppliable is in each case at least one other medium channel through which the fluid medium concerned is removable from the electrochemical device 100.

Each medium channel 156 here is in fluidic connection with a flow field 124, 126, which is associated with the medium concerned, of the bipolar plate 108 such that the medium can flow transversely, preferably substantially perpendicular, to the stacking direction 104 out of the first medium channel 156 and to the second medium channel.

Figure 1:
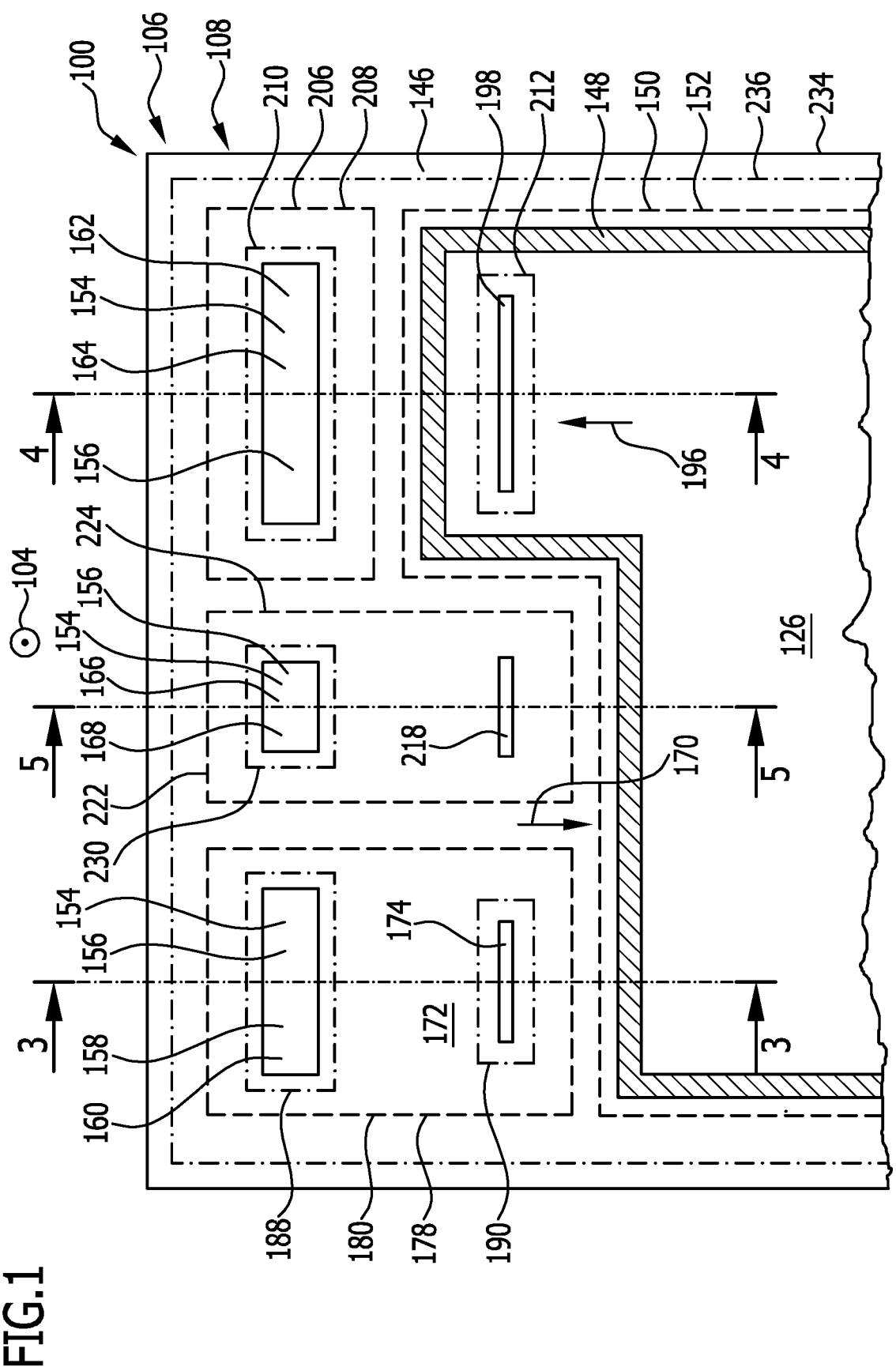
FIG. 1 shows a detail schematic plan view from above of an anode side of a bipolar plate of an electrochemical unit of an electrochemical device that includes a plurality of electrochemical units succeeding one another in a stacking direction, wherein the illustration shows a region of media supply or media removal and part of an anode-side flow field of the bipolar plate.

As can be seen from FIGS. 1 and 2, each bipolar plate 108 includes in particular a passage opening 158 for cathodic fluid, which forms a constituent part of a cathodic fluid removal channel 160 that passes through the electrochemical device 100, a passage opening 162 for anodic fluid, which forms a constituent part of an anodic fluid supply channel 164 that passes through the electrochemical device 100, and a passage opening 166 for coolant, which forms a constituent part of a coolant supply channel 168 that passes through the electrochemical device 100.

As can best be seen from FIG. 3, the anode-side edge web 148 of the bipolar plate 108 with the anode-side flow field seal element 150 in the vicinity of the passage opening 158 for cathodic fluid is offset, away from the passage opening 158 for cathodic fluid, from the cathode-side edge web 132 having the cathode-side flow field seal element 142 in an offset direction 170 perpendicular to the stacking direction 104.

In the intermediate region 172 of the bipolar plate 108 that lies between the anode-side flow field seal element 150 and the cathode-side flow field seal element 142, there is provided on the bipolar plate 108 an aperture 174 for cathodic fluid, through which cathodic fluid from the cathode-side fluid chamber 130 can pass from the cathode side of the bipolar plate 108 to the anode side of the bipolar plate 108, and from there into the removal channel 160 for cathodic fluid.

The direction of flow of the cathodic fluid from the cathode-side fluid chambers 130 of the electrochemical units 106 to the removal channel 160 for cathodic fluid, and within the removal channel 160 for cathodic fluid, is indicated by the arrows 176 in FIG. 3.

Thus, flow of the cathodic fluid is through the aperture 174 for cathodic fluid in the bipolar plate 108 and away over the cathode-side edge web 132 of the bipolar plate 108.

For the purpose of sealing off the removal channel 160 for cathodic fluid and the flow path of the cathodic fluid from the cathode-side fluid chamber 130 as far as the removal channel 160, there is provided on the anode side of the bipolar plate 108 an anode-side channel seal element 178 that extends along a sealing line 180 (see FIG. 1) around the passage opening 158 for cathodic fluid and around the aperture 174 for cathodic fluid.

The anode-side channel seal element 178 is fixed to the bipolar plate 108, preferably in a substance-to-substance bond, and abuts in a fluid-tight sealing manner against an edge reinforcing arrangement 118 that is adjacent to the anode-side bipolar plate layer 146.

Further, for the purpose of sealing off the removal channel 160 for cathodic fluid on the cathode side of the bipolar plate 108, there is provided a cathode-side channel seal element 182 that extends along a sealing line 184 (see FIG. 2) around the passage opening 158 for cathodic fluid.

The cathode-side channel seal element 182 is fixed to the cathode-side bipolar plate layer 134, preferably in a substance-to-substance bond, and abuts in a fluid-tight sealing manner against an edge reinforcing arrangement 118 that is adjacent to the cathode-side bipolar plate layer 134.

For the purpose of sealing off from an interior 186 of the respective bipolar plate 108, which during operation of the electrochemical device 100 is filled with a coolant, the anode-side bipolar plate layer 146 and the cathode-side bipolar plate layer 134 are joined to one another in a fluid-tight manner along a join line 188 that extends around the passage opening 158 for cathodic fluid, and by means of a join line 190 that extends around the aperture 174 for cathodic fluid (see FIGS. 1 and 2).

In the embodiment illustrated in FIGS. 1 to 5, these join lines 188 and 190 preferably take the form of weld lines, in particular resistance weld lines or laser weld lines.

For the purpose of supporting the bipolar plate 108 on its anode side, at the points opposite the region in which the cathode-side channel seal element 182 and the cathode-side flow field seal element 142 run adjacent to one another, one or more support elements 192 are arranged on the anode side of the bipolar plate 108.

The support elements 192 may for example each take the form of a raised portion that is shaped out of the anode-side bipolar plate layer 146.

As an alternative thereto, it is also possible for at least one support element 192 of this kind to take the form of an element that is made separately from the bipolar plate 108 and is arranged, during assembly of the electrochemical device 100, between the bipolar plate 108 and the adjacent anode-side edge reinforcing arrangement 118.

Between the support elements 192 or within the support elements 192 there are provided passage channels for the cathodic fluid to pass through the arrangement of support elements 192.

As can likewise be seen from FIG. 3, on its cathode side, at the point opposite the region in which the anode-side channel seal element 178 and the anode-side flow field seal element 150 run adjacent to one another, the bipolar plate 108 is further provided on its cathode side likewise with support elements 194 by means of which the bipolar plate 108 is supported on the cathode-side gas diffusion layer 112 and on the edge reinforcing arrangement 118 against which the cathode-side gas diffusion layer 112 abuts.

These support elements 194 may be formed onto the cathode-side bipolar plate layer 134, as raised portions, or take the form of elements that are formed separately from the bipolar plate 108 and are arranged, during assembly of the electrochemical device 100, between the bipolar plate 108 and the cathode-side gas diffusion layer 112.

As can be seen from FIG. 4, the electrochemical device 100 is constructed in the region of the supply of anodic fluid from the supply channel 164 for anodic fluid to the anode-side fluid chambers 128 of the electrochemical units 106 in a manner corresponding to the region of the removal of cathodic fluid from the cathode-side fluid chambers 130 to the removal channel 160 for cathodic fluid that is illustrated in FIG. 3, but the anodic fluid is supplied on levels of the electrochemical device 100 that are offset in the stacking direction 104 from the levels on which the cathodic fluid is removed.

Further, in the region of supply of the anodic fluid, the anode-side edge web 148 with the anode-side flow field seal element 150 is offset from the cathode-side edge web 132 with the cathode-side flow field seal element 142 in an offset direction 196 perpendicular to the stacking direction 104 and in opposition to the offset direction 170, that is to say away from the center of the anode-side fluid field 126 and towards the outer edge of the bipolar plate 108.

In the intermediate region 172 between the anode-side edge web 148 and the cathode-side edge web 132 there is provided in this region an aperture 198 for anodic fluid, wherein this aperture 198 passes through the bipolar plate 108.

During operation of the electrochemical device 100, the anodic fluid passes out of the supply channel 164 for anodic fluid, below the anode-side edge web 148 and through the aperture 198 for anodic fluid, upwards into the respective anodic fluid chamber 128.

The direction of flow of the anodic fluid through the supply channel 164 for anodic fluid, through the aperture 198 for anodic fluid 198 and into the anodic fluid chambers 128 is illustrated by the arrows 200 in FIG. 4.

There is arranged on the cathode side of the bipolar plate 108 a cathode-side channel seal element 202, which extends along a sealing line 204 around the passage opening 162 for anodic fluid and around the aperture 198 for anodic fluid and abuts in a fluid-tight sealing manner against an adjacent edge reinforcing arrangement 118.

There is arranged on the anode side of the bipolar plate 108 an anode-side channel seal element 206, which extends around the passage opening 162 for anodic fluid and abuts in a fluid-tight sealing manner against an adjacent edge reinforcing arrangement 118.

The anode-side bipolar plate layer 146 and the cathode-side bipolar plate layer 134 are joined to one another by means of a join line 210 that extends around the passage opening 162 for anodic fluid, and by means of a join line 212 that extends around the aperture 198 for anodic fluid.

Each bipolar plate 108 is provided, on its cathode side, at the point opposite the region in which the anode-side channel seal element 206 runs adjacent to the anode-side flow field seal element 150, with one or more support elements 214.

Further, each bipolar plate 108 is provided, on its anode side, at the point opposite the region in which the cathode-side channel seal element 202 runs adjacent to the cathode-side flow field seal element 142, with one or more support elements 216.

As can be seen from FIG. 5, the electrochemical device 100 is constructed in the region of the supply of coolant to the interiors 186 of the bipolar plates 108 in a manner corresponding to the region of the removal of cathodic fluid from the cathode-side fluid chambers 130 of the electrochemical units 106 that is illustrated in FIG. 3.

In particular, in the embodiment of the electrochemical device 100 that is illustrated in FIGS. 1 to 6, coolant is supplied to the interiors 186 of the bipolar plates 108 on the same level as cathodic fluid is removed from the cathode-side fluid chambers 130.

Further, in the region in which coolant is supplied to the interiors 186, the anode-side edge webs 148 with the anode-side flow field seal elements 150 are offset from the cathode-side edge webs 132 with the cathode-side flow field seal elements 142 in the offset direction 170, that is to say away from the outer edge of the bipolar plates 108 and towards the center of the anode-side flow field 126.

In the intermediate region 172 there is provided on each bipolar plate 108 an aperture 218 for coolant on the anode-side bipolar plate layer 146, wherein coolant from the supply channel 168 for coolant can pass through this aperture 218 and into the interior 186 of the bipolar plate 108.

Thus, this aperture 218 does not extend through the entire multilayer bipolar plate 108.

During operation of the electrochemical device 100, the coolant flows out of the supply channel 168 for coolant and away over the cathode-side edge web 132, through the aperture 218 for coolant and into the interior 186 of the bipolar plate 108.

The direction of flow of the coolant is indicated by the arrows 220 in FIG. 5.

An anode-side channel seal element 222 extends along a sealing line 224 around the passage opening 166 for coolant and around the aperture 218 for coolant, and abuts in a fluid-tight sealing manner against an adjacent edge reinforcing arrangement 118.

On the cathode side of the bipolar plate 108, a cathode-side channel seal element 226 extends along a sealing line 228 around the passage opening 166 for coolant, and abuts in a fluid-tight sealing manner against an adjacent edge reinforcing arrangement 118.

The anode-side bipolar plate layer 146 and the cathode-side bipolar plate layer 134 are joined to one another in a fluid-tight manner along a join line 230 that extends around the passage opening 166 for coolant.

One or more support elements 232 are arranged on the anode side of the bipolar plate 108 at the point opposite the region in which the cathode-side channel seal element 226 runs adjacent to the cathode-side flow field seal element 142.

Close to the outer edge 234 of the bipolar plate 108, the anode-side bipolar plate layer 146 and the cathode-side bipolar plate layer 134 of each bipolar plate 108 are joined to one another in a fluid-tight manner along a join line 236.

The join line 236 is preferably produced by welding, in particular by resistance welding or laser welding.

In principle, it may also be provided for coolant to be supplied to the interiors 186 of the bipolar plates 108 on the same level of the electrochemical device 100 as anodic fluid is supplied to the anode-side fluid chambers 128.

Further, as regards each medium to be supplied to the electrochemical device 100 (cathodic fluid, anodic fluid and coolant), it is possible to exchange the regions of supply and removal of the fluid medium concerned, such that the directions of flow of these media through the electrochemical device 100 that are indicated by the arrows 176, 200 and 220 are reversed.

Here, each direction of flow of one of these fluid media may be combined with any desired directions of flow of the other media.

In FIGS. 3 to 5, the anode-side channel seal elements 178, 206 and 222 are respectively illustrated as separate from the adjacent anode-side flow field seal element 150; as an alternative thereto, however, it may also be provided for the anode-side channel seal elements 178, 206 and/or 222 respectively to take a form that is in one piece with the respectively adjacent area of the anode-side flow field seal element 150.

Further, in FIGS. 3 to 5 the cathode-side channel seal elements 182, 202 and 226 are also respectively illustrated as separate from the adjacent cathode-side flow field seal element 142. In principle, however, it is also possible for the cathode-side channel seal element 182, 202 and/or 226 respectively to take a form in one piece with the adjacent area of the cathode-side flow field seal element 142.

Further, in FIGS. 1 and 2 the anode-side channel seal elements 178, 206 and 222 are illustrated as separate from one another. In principle, however, it is also possible to form two or more of the anode-side channel seal elements 178, 206 and 222 in one piece with one another.

Moreover, in FIG. 2 the cathode-side channel seal elements 182, 202 and 226 are illustrated as separate from one another. In principle, however, it is also possible to form two or more of the cathode-side channel seal elements 182, 202 and 226 in one piece with one another.

The seal elements 142, 150, 178, 182, 202, 206, 222 and 226 are preferably formed on the bipolar plate 108 such that they do not overlap with the join lines 188, 190, 210, 212, 230 and 236 at which the anode-side bipolar plate layer 146 and the cathode-side bipolar plate layer 134 are joined to one another. In particular, it is preferably provided for the seal elements not to cross the join lines—as seen in the stacking direction 104—nor to run parallel thereto above or below the join lines, as seen in the stacking direction 104.

This makes it possible to join the anode-side bipolar plate layer 146 and the cathode-side bipolar plate layer 134 to one another after the said, preferably elastomeric, seal elements have been produced on the bipolar plate layers 146 and 134 respectively.

FIGS. 13 to 16 show different ways, during production of the bipolar plates 108, of attaching the gas diffusion layers 112, 114 together with the respective flow field seal element 142, 150 to the respectively associated edge web 132, 148.

FIG. 13 shows how a flow field seal element, for example the anode-side flow field seal element 150, can be produced by an injection molding procedure and at the same time connected in a substance-to-substance bond with the respectively associated bipolar plate layer, for example the anode-side bipolar plate layer 146, and with the respectively associated gas diffusion layer, for example the anode-side gas diffusion layer 114.

The bipolar plate layer 146 is preferably produced by a forming procedure, in particular by a stamping or deep drawing procedure, from a metal starting material, in particular a sheet metal material, during which the edge web 148 is made.

The gas diffusion layer 114 is laid on the bipolar plate layer 146 such that it substantially entirely covers the crest region 140 of the edge web 148 and extends beyond it on the side of the edge web 148 remote from the flow field 126.

A first injection mold 238 is placed with pressure edges 240 and 242 on the bipolar plate layer 146 and the gas diffusion layer 114 respectively such that the cavity 244 that is to be filled with the preferably elastomeric injection molding material is formed.

A second injection mold 246 is applied to the bipolar plate layer 146, on the side thereof remote from the cavity 244, in order to serve as a counter-holder for pressing the bipolar plate layer 146 and the gas diffusion layer 114 in the region of the pressure edges 240 and 242 of the first injection mold 238.

When the cavity 244 is then filled with the elastomer material to be cured, from which the flow field seal element 150 is formed, the elastomer material also penetrates into the edge region 248 of the porous gas diffusion layer 114 that faces the cavity 244, with the result that the gas diffusion layer 114 is closely connected, in a substance-to-substance bond, with the flow field seal element 150.

Once the elastomer material has cured and the injection molding tools 238 and 246 have been removed, the arrangement comprising the flow field seal element 150, the bipolar plate layer 146 and the gas diffusion layer 114 have the shape shown in FIG. 16, wherein the flow field seal element 150 is also connected in a substance-to-substance bond with the bipolar plate layer 146, in particular with the outer flank 138 of the edge web 148.

The flow field seal element 150 may have one or more sealing lips 250 by means of which the flow field seal element 150 abuts in a fluid-tight sealing manner against the respectively adjacent edge reinforcing arrangement 118 when the electrochemical device 100 is in the assembled condition.

An alternative way of attaching the flow field seal element 150 to the bipolar plate layer 146 and the gas diffusion layer 114 is illustrated in FIG. 14.

In this alternative embodiment, the gas diffusion layer 114 does not extend over the entire crest region 140 of the edge web 148 and onto the side of the edge web 148 remote from the flow field 126; rather, the gas diffusion layer 114, which abuts against the crest region 140, ends within the crest region 140 of the edge web 148.

In this embodiment, the flow field seal element 150 extends over an area of the crest region 140 of the edge web 148 that is not covered by the gas diffusion layer 114 and over the edge region 248 of the gas diffusion layer 114, and preferably also penetrates into the edge region 248 of the gas diffusion layer 114, in order to make an in particular close, substance-to-substance bond between the flow field seal element 150 and the gas diffusion layer 114.

Preferably in this embodiment, it is provided for the flow field seal element 150 not to extend as far as the outer flank 138 of the edge web 148.

In this embodiment too, the flow field seal element 150 may have one or more sealing lips 250.

The flow field seal element 150 according to FIG. 14 may also be produced on the bipolar plate layer 146 and the gas diffusion layer 114, for example by an injection molding method.

An alternative way of attaching the flow field seal element 150 to the bipolar plate layer 146 and the gas diffusion layer 114, which is illustrated in FIG. 15, differs from the embodiment illustrated in FIG. 14 in that the flow field seal element 150 is substantially unprofiled and in particular has no shaped sealing lips 250.

A flow field seal element 150 of this kind may for example be produced by a pattern printing method, in particular a screen printing method, or by applying, from an applicator, a bead of elastomer material to be cured to the edge web 148 of the bipolar plate layer 146 and to the edge region 248 of the gas diffusion layer 114 (so-called CIP (cured in place) method).

In the embodiment of the electrochemical device 100 that is illustrated in FIGS. 1 to 5, the anode-side flow field seal elements 150 and the cathode-side flow field seal elements 142 each abut in a fluid-tight sealing manner against an adjacent edge reinforcing arrangement 118.

An alternative embodiment of an electrochemical device 100 of this kind, illustrated in FIGS. 6 to 12, differs from the first embodiment illustrated in FIGS. 1 to 5 in that the anode-side flow field seal elements 150 each abut in a fluid-tight sealing manner against a cathode-side flow field seal element 142 of a bipolar plate 108 that lies above it, as seen in the stacking direction 104, in a fluid-tight sealing manner (see FIGS. 8 to 12).

To enable this, the mutually facing edge webs 132, 148 of two bipolar plates 108*a* and 108*b* that succeed one another as seen in the stacking direction 104, and which are each arranged on the mutually opposite sides of the same membrane electrode assembly 110, are arranged congruently with one another—as seen in the stacking direction 104—while the edge webs 132 and 148 of the same bipolar plate 108*a* or 108*b*, just as in the first embodiment illustrated in FIGS. 1 to 5, are still arranged offset from one another in certain areas, in an offset direction 170 or 196 that is oriented perpendicular to the stacking direction 104.

Preferably, this is achieved in that the bipolar plates 108*a* and 108*b* that directly succeed one another in the stacking direction take an identical form but, during assembly of the electrochemical device 100, are each installed in the stack rotated through an angle of 180° about an axis of rotation parallel to the stacking direction 104.

As can be seen from FIGS. 8 to 11, in the region of supplying a fluid to the respective fluid chambers 128, 130 of the electrochemical units 106, as a result the edge webs 132, 148 are offset towards the center point of the respectively associated flow field 124, 126 in a first level of the electrochemical device 100 and are offset outwards, away from the center point of the respectively associated flow field 124, 126, in an adjoining second level, as seen in the stacking direction 104, of the electrochemical device 100.

Here, in the level in which the edge webs 132, 148 are offset towards the center of the flow field 124, 126, fluid is supplied from the respective fluid channel to the respectively associated aperture 174, 198 for the fluid concerned in the bipolar plate 108*a*, 108*b*, wherein the fluid concerned is guided away over the edge webs 132, 148 in the respectively adjacent level.

Then, at the respective aperture 174, 198 the fluid passing through the bipolar plate 108*a*, 108*b* transfers into the respectively associated fluid chamber 128, 130 of the adjacent level, as seen in the stacking direction 104, of the electrochemical device 100.

This is explained in more detail in the examples below, with reference to the sectional illustrations in FIGS. 8 to 11:

It can be seen from FIG. 8 how cathodic fluid from the supply channel 252 for cathodic fluid in the first and third levels (counting from the top) of the electrochemical device 100 reaches the apertures 174 for cathodic fluid in the bipolar plates 108*a* and passes through this aperture to reach the cathode-side fluid chambers 130 on the cathode side of a first set of membrane electrode assemblies 110*a*.

Figure 9:
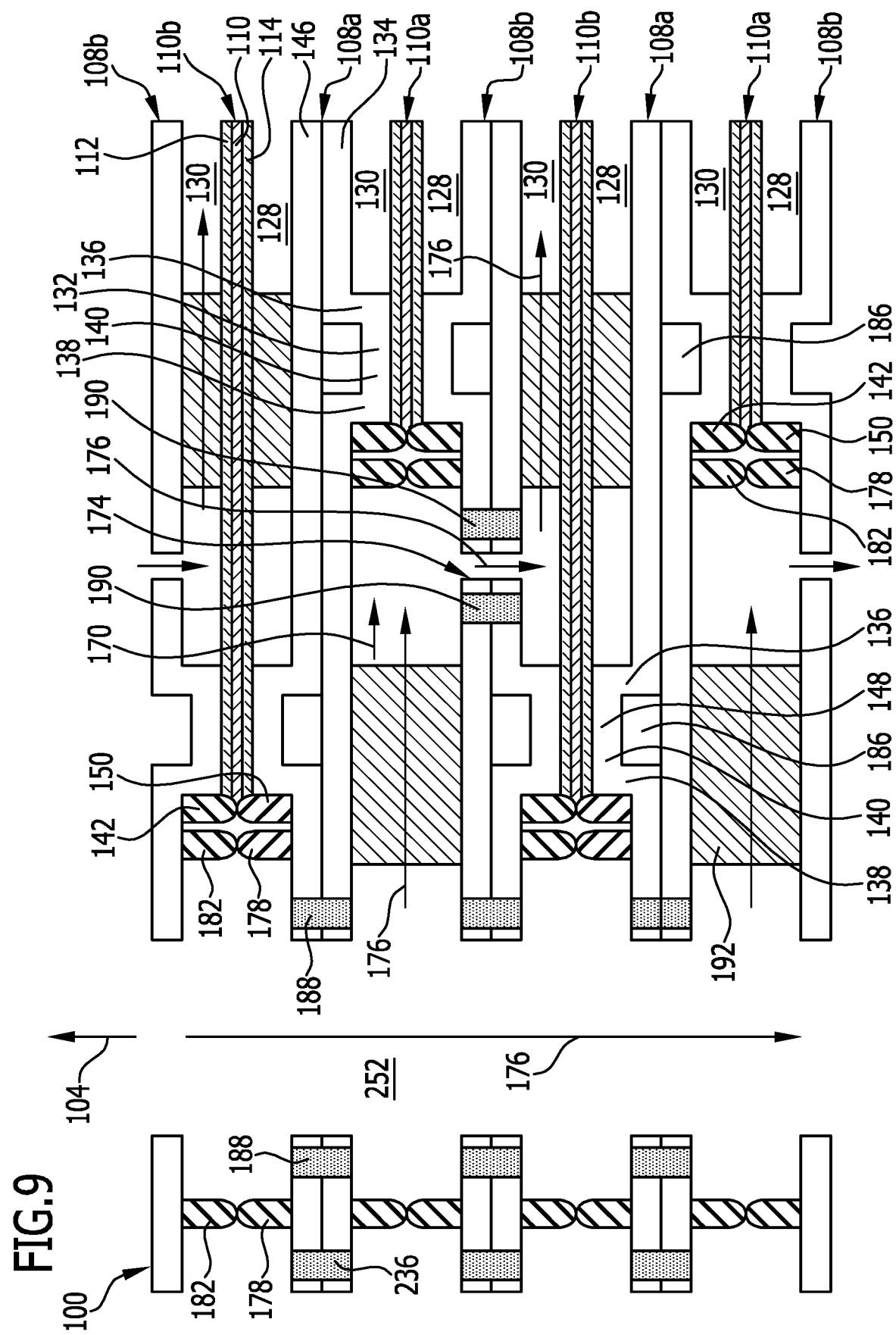
FIG. 9 shows a schematic section through the electrochemical device containing the bipolar plate from FIGS. 6 and 7, in a region of supply of a cathodic fluid to a second set of membrane electrode assemblies, along the line 9-9 in FIG. 6.

It can be seen from FIG. 9 how cathodic fluid from the supply channel 252 for cathodic fluid in the second and fourth levels of the electrochemical device 100 reaches the apertures 174 for cathodic fluid in the bipolar plates 108*b*, which are arranged rotated in relation to the bipolar plates 108*a* through an angle of 180° about an axis of rotation parallel to the stacking direction 104. From the apertures 174 for cathodic fluid of these bipolar plates 108*b*, the cathodic fluid reaches the cathode-side fluid chambers 130 on the cathode side of a second set of membrane electrode assemblies 110*b*.

As can be seen from FIG. 6, between the levels of section of FIGS. 8 and 9 the cathode-side edge web 132 changes from the outwardly offset position (in FIG. 8) to the inwardly offset position (in FIG. 9). Accordingly, in this region of the bipolar plate 108, the anode-side edge web 148 changes from the inwardly offset position to the outwardly offset position.

Figure 10:
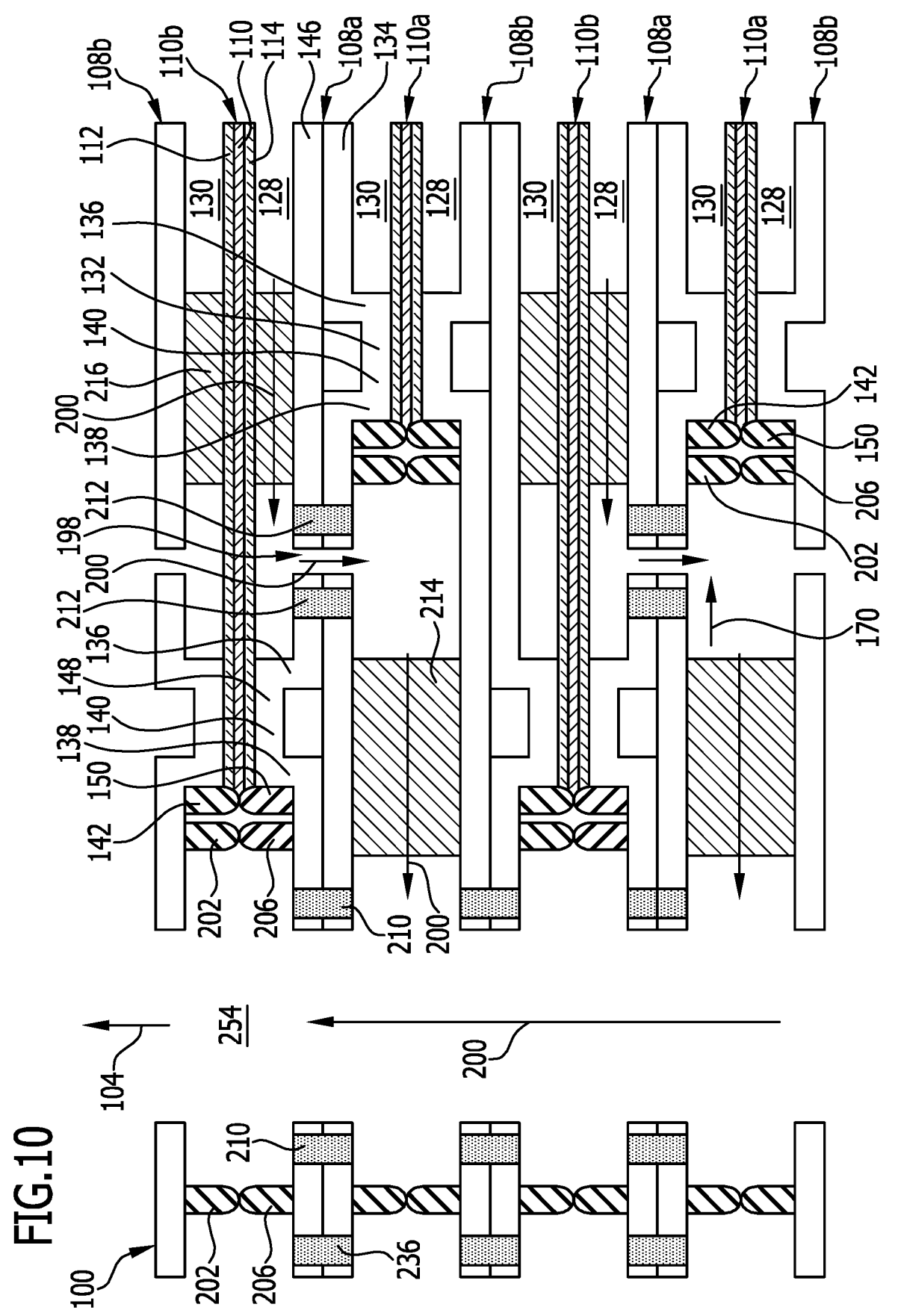
FIG. 10 shows a schematic section through the electrochemical device containing the bipolar plate from FIGS. 6 and 7, in a region of removal of an anodic fluid from the second set of membrane electrode assemblies, along the line 10-10 in FIG. 6.

As can be seen from FIG. 10, anodic fluid is supplied to the removal channel 254 for anodic fluid in the second and fourth levels of the electrochemical device 100 from the apertures 198 for anodic fluid in the bipolar plates 108*a*.

These apertures 198 for anodic fluid are in fluidic connection with the anode-side fluid chambers 128 on the anode side of the second set of membrane electrode assemblies 110*b*.

As can be seen from FIG. 11, anodic fluid is supplied to the removal channel 254 for anodic fluid in the first and third levels of the electrochemical device 100 from the apertures 198 for anodic fluid in the bipolar plates 108*b*.

These apertures 198 for anodic fluid are in fluidic connection with the anode-side fluid chambers 128 on the anode side of the first set of membrane electrode assemblies 110*a*.

As can seen from FIG. 6, between the levels of section of FIGS. 10 and 11, the cathode-side edge web 132 of the bipolar plate 108 changes from its inner position (in FIG. 10) to its outer position (in FIG. 11).

Accordingly, in this region the anode-side edge web 148 changes from its outer position (in FIG. 10) to its inner position (FIG. 11).

As can be seen from FIG. 12, in this embodiment the coolant from the supply channel 168 for coolant comes through gaps 256 between the cathode-side bipolar plate layer 134 and the anode-side bipolar plate layer 146 respectively of the same bipolar plate 108 and reaches the interior 186 of the respective bipolar plate 108 directly, without changing levels.

In each of the gaps 156 there may be provided one or more support elements 258 that keep the cathode-side bipolar plate layer 134 and the anode-side bipolar plate layer 146 spaced from one another in order to enable the coolant to flow through.

These support elements 258 are preferably arranged in the region in which the flow field seal elements 142, 150 and the channel seal elements 222, 226—as seen in the stacking direction 104—cross the flow path of the coolant.

Otherwise, the second embodiment of the electrochemical device 100 that is illustrated in FIGS. 6 to 12 corresponds, as regards its structure, functioning and production, to the first embodiment illustrated in FIGS. 1 to 5, so in this respect reference is made to the description thereof above.

A third embodiment of the electrochemical device that is illustrated in FIGS. 17 to 19 differs from the second embodiment illustrated in FIGS. 6 to 12 in that the cathode-side bipolar plate layers 134 and the respectively associated anode-side bipolar plate layers 146 are not joined to one another by joins along join lines 188, 190, 210, 212, 230 and 236 in order to seal off the interior 186, which is filled with coolant during operation of the electrochemical device, from the surroundings; rather, in this embodiment the interior 186 of the bipolar plate 108 is sealed off by a seal arrangement that includes seal elements arranged on a respective inner side, facing the interior 186, of the cathode-side bipolar plate layer 134 or the anode-side bipolar plate layer 146.

For example, channel seal elements 260 may be provided on the inner side of the cathode-side bipolar plate layer 134, illustrated in FIG. 17, and these extend respectively around the supply channel 252 for cathodic fluid, around the removal channel 254 for anodic fluid, around the removal channel 160 for cathodic fluid and around the supply channel 164 for anodic fluid.

Further, aperture seal elements 262 that extend around a respective one of the apertures 198 for anodic fluid may be provided on the inner side of the cathode-side bipolar plate layer 134.

On the inner side of the anode-side bipolar plate layer 146, illustrated in FIG. 18, aperture seal elements 264 that extend around a respective one of the apertures 174 for cathodic fluid may be provided.

The aperture seal elements 262 and 264 are preferably fixed to the bipolar plate layer 134 or 146 respectively at which the aperture 198 or 174 concerned is not covered by a gas diffusion layer 112 or 114.

The inner side of the cathode-side bipolar plate layer 134 may further be provided with an edge seal element 274 that runs peripherally along its outer edge 276.

In order to make sufficient volume available for receiving these seal elements, it may be provided, for each of these seal elements, for a corresponding recess to be provided on the inner side of the respectively opposite bipolar plate layer 134 or 146 in each case, wherein the seal element concerned engages in this recess in the assembled condition of the electrochemical device 100 and abuts therein against the respectively opposite bipolar plate layer 134 or 146 in a fluid-tight sealing manner.

In this way it may be provided in particular for the cathode-side bipolar plate layer 134 that is illustrated in FIG.

17 to have recesses 266 for receiving the aperture seal elements 264 on the anode-side bipolar plate layer 146.

Further, it may be provided for the anode-side bipolar plate layer 146 to have on its inner side recesses 268 for receiving the aperture seal elements 262 on the cathode-side bipolar plate layer 134, recesses 270 for receiving the channel seal elements 260 on the cathode-side bipolar plate layer 134, and a recess 272 for receiving the edge seal element 274 on the cathode-side bipolar plate layer 134.

The seal elements for sealing off the interior 186 of the bipolar plate 108 may also be fixed in a recess 266', 268', 270' and 272' on the bipolar plate layer 134 or 146 that carries the seal element.

The said seal elements on the inner sides of the cathode-side bipolar plate layer 134 and the anode-side bipolar plate layer 146 are clamped against one another when the electrochemical device is assembled by means of the clamping device (not illustrated) of the electrochemical device 100 such that sufficient sealing force on the seal elements is ensured. This clamping force produced by the clamping device is illustrated schematically in FIG. 19 by the arrows F. So that the clamping force for pressing the seal elements can be introduced into the bipolar plate layers 134, 146, additional support elements 280 are provided between bipolar plates 108 succeeding one another in the stacking direction 104.

Further, it should be noted that in FIG. 19 the respectively mutually associated cathode-side and anode-side bipolar plate layers 134 and 146 are illustrated spaced from one another in the stacking direction 104, in order to indicate which of the seal elements is arranged on which bipolar plate layer 134 or 146 in this embodiment.

In principle, however, the seal elements for sealing the interior 186 of the bipolar plate 108 may be fixed to the cathode-side bipolar plate layer 134 or the anode-side bipolar plate layer 146 as desired.

Otherwise, the third embodiment of the electrochemical device 100 that is illustrated in FIGS. 17 to 19 corresponds, as regards its structure, functioning and production, to the second embodiment illustrated in FIGS. 6 to 12, so in this respect reference is made to the description thereof above.

A fourth embodiment of the electrochemical device 100 that is illustrated in FIG. 20 differs from the second embodiment illustrated in FIGS. 6 to 12 in that the mutually respectively associated cathode-side bipolar plate layers 134 and anode-side bipolar plate layers 146 are joined to one another along the join lines 188, 190, 210, 212, 230 and/or 236 not by welding but by adhesion, in particular in a substance-to-substance bond.

Preferably, in this case the bipolar plate layers 134 and 146 are attached to one another by adhesion after arrangement of the gas diffusion layers 112 and 114 and after the flow field seal elements 142 and 150 have been produced on the bipolar plate layers 134 and 146 respectively.

Unlike the second embodiment that is illustrated in FIGS. 6 to 12, in this case it is preferably provided for the flow field seal elements 142, 150 produced on the bipolar plate layers 134 and 146 and/or the channel seal elements 178, 182 produced on the bipolar plate layers 134 and 146 to overlap with the join lines 188, 190, 210, 212, 230 and/or 236 at which the bipolar plate layers 134 and 146 are joined to one another by adhesion, which makes possible a more compact structure of the bipolar plates 108 and hence of the electrochemical device 100 as a whole in the region of the said seal elements.

Otherwise, the fourth embodiment of the electrochemical device 100 that is illustrated in FIG. 20 corresponds, as regards its structure, functioning and production, to the second embodiment illustrated in FIGS. 6 to 12, so in this respect reference is made to the description thereof above.

FIGS. 21 and 22 show a comparison of the space needed for a seal structure according to the prior art (FIG. 21) and a seal structure in the second to fourth embodiments of an electrochemical device 100 (FIG. 22) as illustrated in FIGS. 6 to 12 and 17 to 20.

The seal structure according to the prior art that is illustrated in FIG. 21 includes a membrane electrode assembly 110 that is provided with an edge reinforcing arrangement 118 comprising two edge reinforcing layers 278 that enclose the outer edge region 116 of the membrane electrode assembly 110, a cathode-side gas diffusion layer 112, an anode-side gas diffusion layer 114, a cathode-side flow field seal element 142' and an anode-side flow field seal element 150', wherein the seal elements 142' and 150' may be fixed selectively to the edge reinforcing arrangement 118 or to an adjacent bipolar plate 108 (not illustrated).

Here, the region of overlap between the membrane electrode assembly 110 and the edge reinforcing arrangement 118 must have a width $b_1$ of approximately 2 mm to approximately 5 mm. Between the seal elements 142' and 150' on the one hand and the membrane electrode assembly 110 on the other, a spacing $b_2$ of approximately 3 mm to approximately 6 mm must be maintained. The width $b_3$ of the flow field seal elements 142' and 150' is in each case approximately 4 mm to approximately 7 mm. Between the flow field seal elements 142' and 150' on the one hand and the outer edge of the edge reinforcing arrangement on the other, a spacing $b_4$ of approximately 1 mm to approximately 3 mm must be maintained.

The total width B (equal to $b_1+b_2+b_3+b_4$) of the seal structure is thus from approximately 10 mm to approximately 20 mm.

The seal structure according to the invention that is illustrated in FIG. 22 includes a membrane electrode assembly 110, which in this embodiment has no edge reinforcing arrangement 118, a cathode-side gas diffusion layer 112, an anode-side gas diffusion layer 114, a cathode-side bipolar plate layer 134 having a cathode-side edge web 132, an anode-side bipolar plate layer 146 having an anode-side edge web 148, a cathode-side flow field seal element 142 and an anode-side flow field seal element 150, wherein the two flow field seal elements 142 and 150 in this embodiment abut directly against one another in a fluid-tight sealing manner.

With this seal structure, the width $d_1$ of the flow field seal elements 142 and 150 (including the elastomer material penetrating into the respectively associated gas diffusion layer 112 and 114) is approximately 4 mm to approximately 7 mm. Between the flow field seal elements 142 and 150 on the one hand and the outer edge 276 of the bipolar plate layers 134 and 146 on the other, a spacing $d_2$ of approximately 1 mm to approximately 3 mm must be maintained.

The total width D (equal to $d_1+d_2$) of the seal structure according to FIG. 22 is thus from approximately 5 mm to approximately 10 mm and is thus only approximately half as large as the width B of the seal structure according to the prior art from FIG. 21.

For this reason, the electrochemical device having the seal structure according to FIG. 22 can be made to take up significantly less space than an electrochemical device 100 having the seal structure according to FIG. 21.

A seal structure that is illustrated in FIG. 23 differs from the seal structure according to FIG. 22 in that a flow field seal element, for example the cathode-side flow field seal element 142, that is in contact with the edge web, for example the cathode-side edge web 132, of a first bipolar plate 108 and in contact with a first gas diffusion layer, for example the cathode-side gas diffusion layer 112, extends as far as a second bipolar plate 108' that is opposite the first bipolar plate 108.

With this seal structure, the second flow field seal element, for example the anode-side flow field seal element 150, may be omitted.

The flow field seal element 142 is preferably formed from an elastomer material that penetrates in particular into the associated gas diffusion layer 112 such that the flow field seal element 142 is connected to the gas diffusion layer 112 in a substance-to-substance bond.

Further, the flow field seal element 142 is preferably connected to the edge web 132 in a substance-to-substance bond.

If the first bipolar plate 108 is of a multilayer construction, the flow field seal element 142 is preferably fixed to the cathode-side bipolar plate layer 134 of the first bipolar plate 108.

The flow field seal element 142 abuts against the second bipolar plate 108', in particular against an anode-side bipolar plate layer 146 of the second bipolar plate 108', in sealing manner, preferably by means of a sealing lip 282, and abuts against the membrane electrode assembly 110, in particular against the cathode side of the membrane electrode assembly 110, in sealing manner, preferably by means of a further sealing lip 284.

As a result of this, the flow field seal element 142 seals off in fluid-tight manner both a flow field of the first bipolar plate 108, preferably the cathode-side flow field 124, and also a flow field of the second bipolar plate 108', preferably the anode-side flow field 126.

In order to enable the flow field seal element 142 to abut in sealing manner against the membrane electrode assembly 110, in this embodiment an outer edge 286 of the gas diffusion layer 112 to which the flow field seal element 142 is fixed is offset inwardly in relation to an outer edge 288 of the membrane electrode assembly 110, in a direction perpendicular to the stacking direction 104.

In this embodiment, the flow field seal element 142 may be spaced from the edge web 148 of the second bipolar plate 108', in particular by the anode-side edge web 148.

An alternative seal structure that is illustrated in FIG. 24 differs from the seal structure illustrated in FIG. 22 in that one of the flow field seal elements, for example an anode-side flow field seal element 150', is not fixed to the adjacent bipolar plate 108' but is merely connected to the associated gas diffusion layer, for example the anode-side gas diffusion layer 114, preferably by a substance-to-substance bond.

In this embodiment, the flow field seal element 150' abuts in sealing manner against the second bipolar plate 108' by means of one or more sealing lips 290.

If the bipolar plate 108' is of a multilayer construction, the flow field seal element 150' preferably abuts against an anode-side bipolar plate layer 146 of the bipolar plate 108'.

Further, in this embodiment the flow field seal element 150' abuts directly against the flow field seal element 142 in a fluid-tight sealing manner.

In this embodiment, the flow field seal element 150' need not be in contact with the edge web of the bipolar plate 108', in particular the anode-side edge web 148.

The invention claimed is:

1. An electrochemical device, including
a stack of a plurality of electrochemical units that succeed one another in a stacking direction and each include an electrochemically active membrane electrode assembly, at least one gas diffusion layer and a bipolar plate having at least one flow field for at least one fluid medium, wherein at least one bipolar plate has at least one edge web, which borders a flow field of the bipolar plate at least in certain areas and is in contact with a gas diffusion layer adjacent to the bipolar plate, wherein the electrochemical device further includes at least one flow field seal element that seals off the flow field bordered by the edge web and is in contact with the edge web and in contact with the gas diffusion layer; and wherein two bipolar plate that succeed one another in the stacking direction are provided on mutually facing sides with a respective edge web that is in contact with a respective flow field seal element, wherein the flow field seal elements with which the edge webs of the bipolar plates are in contact abut against one another in sealing manner.

2. The electrochemical device according to claim 1, wherein the flow field seal element is connected to the edge web in a substance-to-substance bond.

3. The electrochemical device according to claim 1, wherein the flow field seal element is connected to the gas diffusion layer in a substance-to-substance bond.

4. The electrochemical device according to claim 1, wherein the flow field seal element is an injection molded part that is formed onto the edge web and/or onto the gas diffusion layer.

5. The electrochemical device according to claim 1, wherein the flow field seal element is produced on the edge web and/or the gas diffusion layer by a pattern printing method.

6. The electrochemical device according to claim 1, wherein the bipolar plate has on its anode side an anode-side edge web and on its cathode side a cathode-side edge web, wherein the anode-side edge web and the cathode-side edge web are offset from one another at least in certain areas, in an offset direction running perpendicular to the stacking direction.

7. The electrochemical device according to claim 6, wherein the bipolar plate has, in an intermediate region between the anode-side edge web and the cathode-side edge web, at least one aperture for a fluid medium to pass through the bipolar plate or into an interior of the bipolar plate.

8. The electrochemical device according to claim 7, wherein the at least one aperture is in fluidic connection with a medium channel that extends through the bipolar plate in the stacking direction.

9. The electrochemical device according to claim 1, wherein at least one membrane electrode assembly is provided with an edge reinforcing arrangement against which the flow field seal element abuts in sealing manner.

10. The electrochemical device according to claim 1, wherein the two bipolar plates that succeed one another in the stacking direction take a substantially identical form but are arranged rotated by an angle of 180° to one another about an axis of rotation that is parallel to the stacking direction.

11. The electrochemical device according to claim 1, wherein at least one bipolar plate having an edge web that is in contact with a flow field seal element includes two bipolar plate layers that are joined to one another along join lines.

12. The electrochemical device according to claim 11, wherein the bipolar plate layers are joined to one another along join lines by welding and/or by adhesion.

13. The electrochemical device according to claim 11, wherein the flow field seal element that is arranged on the bipolar plate does not overlap the join lines as seen in the stacking direction.

14. The electrochemical device according to claim 1, wherein at least one bipolar plate includes two bipolar plate layers that are sealed off from the surroundings at at least one of the bipolar plate layers by producing a seal.

15. The electrochemical device according to claim 1, wherein the flow field seal element that is in contact with the edge web of a first bipolar plate and in contact with a first gas diffusion layer extends as far as a second bipolar plate opposite the first bipolar plate.

16. The electrochemical device according to claim 1, wherein the flow field seal element that is in contact with the edge web of a first bipolar plate and in contact with a first gas diffusion layer abuts in sealing manner against a further flow field seal element that is in contact with a second gas diffusion layer and abuts in sealing manner against a second bipolar plate opposite the first bipolar plate.

17. A method for producing an electrochemical unit for an electrochemical device in which a plurality of electrochemical units succeed one another in a stacking direction,
wherein the electrochemical unit includes an electrochemically active membrane electrode assembly, at least one gas diffusion layer and a bipolar plate having at least one flow field for at least one fluid medium and at least one edge web, which borders a flow field of the bipolar plate at least in certain areas and is in contact with a gas diffusion layer adjacent to the bipolar plate, and
wherein the method includes the following:
arranging the gas diffusion layer on the bipolar plate or on a bipolar plate layer of the bipolar plate;
producing a flow field seal element on the bipolar plate or the bipolar plate layer and on the gas diffusion layer such that the flow field seal element is in contact both with the bipolar plate or the bipolar plate layer and also with the gas diffusion layer;
providing two bipolar plates that succeed one another in the stacking direction on mutually facing sides with a respective edge web that is in contact with a respective flow field seal element, wherein the flow field seal elements with which the edge webs of the bipolar plates are in contact abut against one another in sealing manner.

18. The method according to claim 17, wherein the bipolar plate has at least one edge web, which borders a flow field of the bipolar plate at least in certain areas,
wherein during production of the flow field seal element the gas diffusion layer is in contact with the edge web.

19. The electrochemical device according to claim 14, wherein the seal is made from an elastomer material.

* * * * *

UNITED STATES PATENT AND TRADEMARK OFFICE
CERTIFICATE OF CORRECTION

PATENT NO. : 10,833,337 B2
APPLICATION NO. : 15/837146
DATED : November 10, 2020
INVENTOR(S) : Stahl et al.

Page 1 of 1

It is certified that error appears in the above-identified patent and that said Letters Patent is hereby corrected as shown below:

In the Specification

At Column 6, Line 16, the text "or by a OP (cured in place) method." should be changed to
-- or by a CIP (cured in place) method. --

Signed and Sealed this
Seventeenth Day of August, 2021

Drew Hirshfeld
*Performing the Functions and Duties of the
Under Secretary of Commerce for Intellectual Property and
Director of the United States Patent and Trademark Office*